United States Patent Office 3,849,388

Patented Nov. 19, 1974

3,849,388

ANALOGUES OF HUMAN THYROCALCITONIN

Werner Rittel, Basel, Max Brugger, Birsfelden, Bruno Kamber, Basel, Bernhard Riniker, Frenkendorf, and Peter Sieber, Reinach, Basel-Land, Switzerland, and Hendrik Marie Greven, Heesch, Netherlands, assignors to Ciba-Geigy Corporation, Ardsley, N.Y.

No Drawing. Continuation of abandoned application Ser. No. 864,544, Oct. 7, 1969. This application Sept. 28, 1972, Ser. No. 293,271

Claims priority, application Switzerland Oct. 15, 1968, 15,401/68; Nov. 20, 1968, 17,286/68

Int. Cl. A61k *27/00;* C07c *103/52*

U.S. Cl. 260—112.5 14 Claims

ABSTRACT OF THE DISCLOSURE

The new peptides of the formula I 1 2 3 4 5 6 7 8 9 10 11 12
H-Cys-Gly-Asn-Leu-Ser-Thr-Cys-Met-Leu-Gly-Thr-Tyr- 13 14 15 16 17 18 19 20 21 22 23 24
Thr-Gln-Asp-Phe-Asn-Lys-Phe-His-Thr-Phe-Pro-Gln- 25 26 27 28 29 30 31 32
Thr-Ala-Ile-Gly-Val-Gly-Ala-Pro-$NH_2$ (I)

Figure 2:
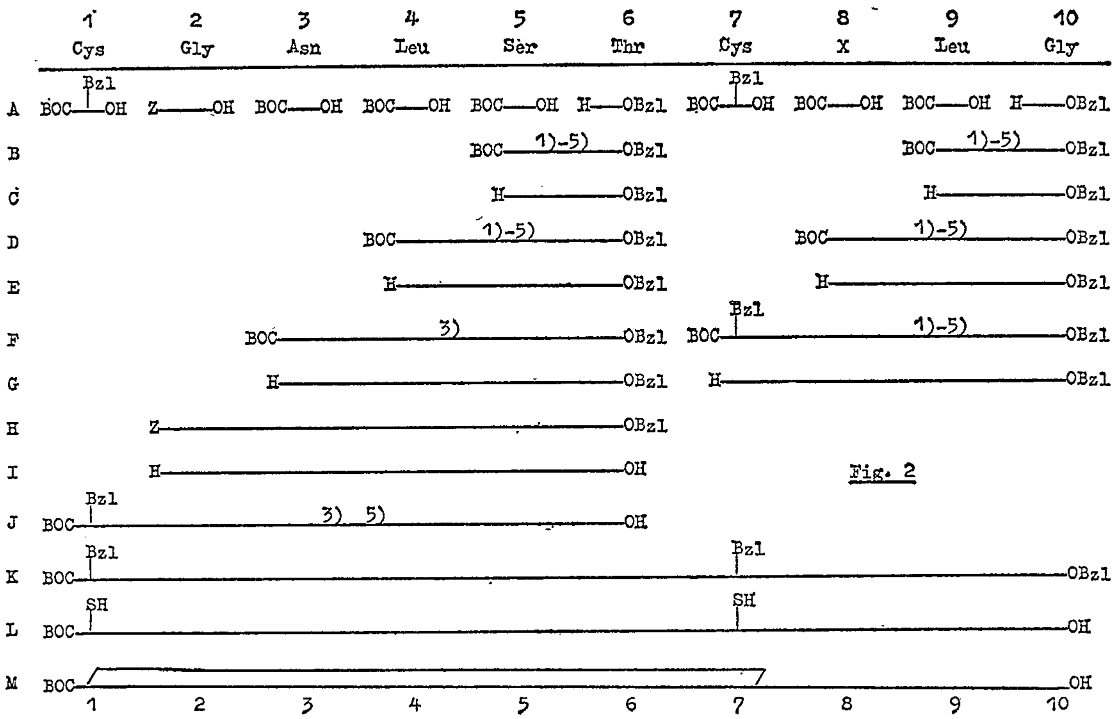
Figure 3:
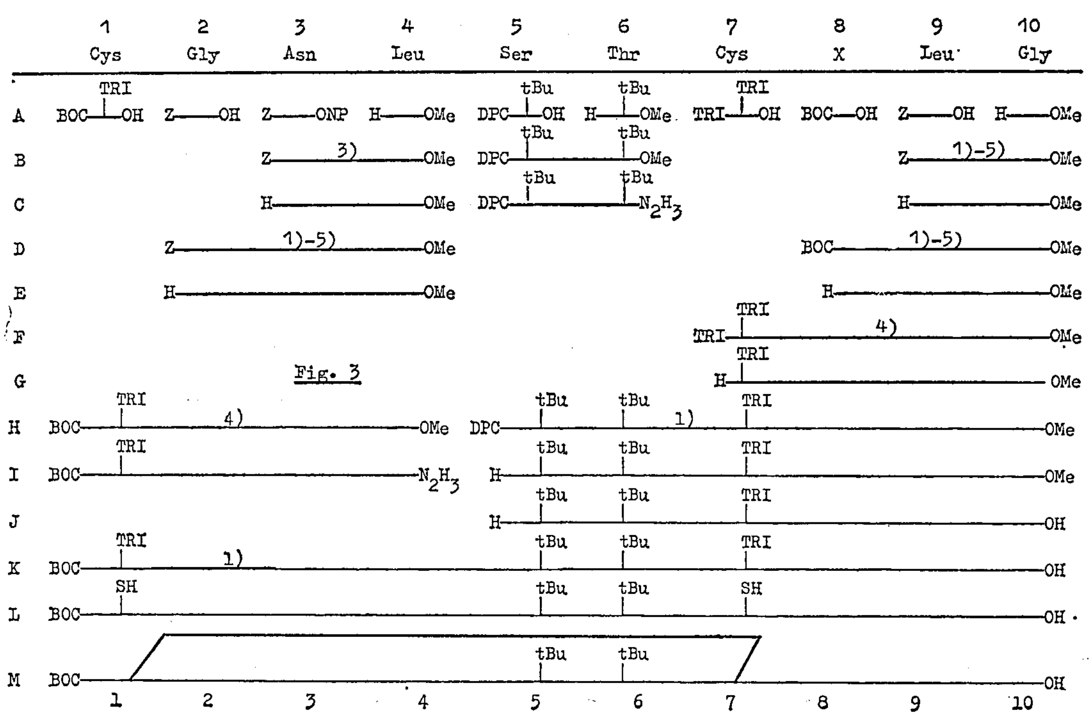
Figure 7:
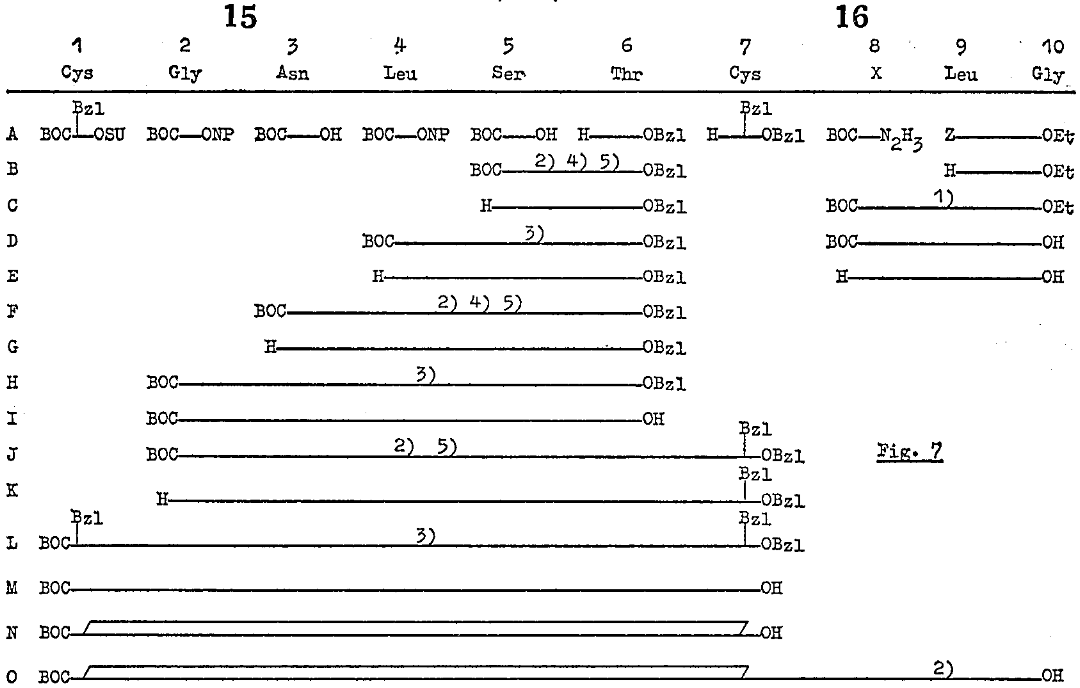
Figure 8:
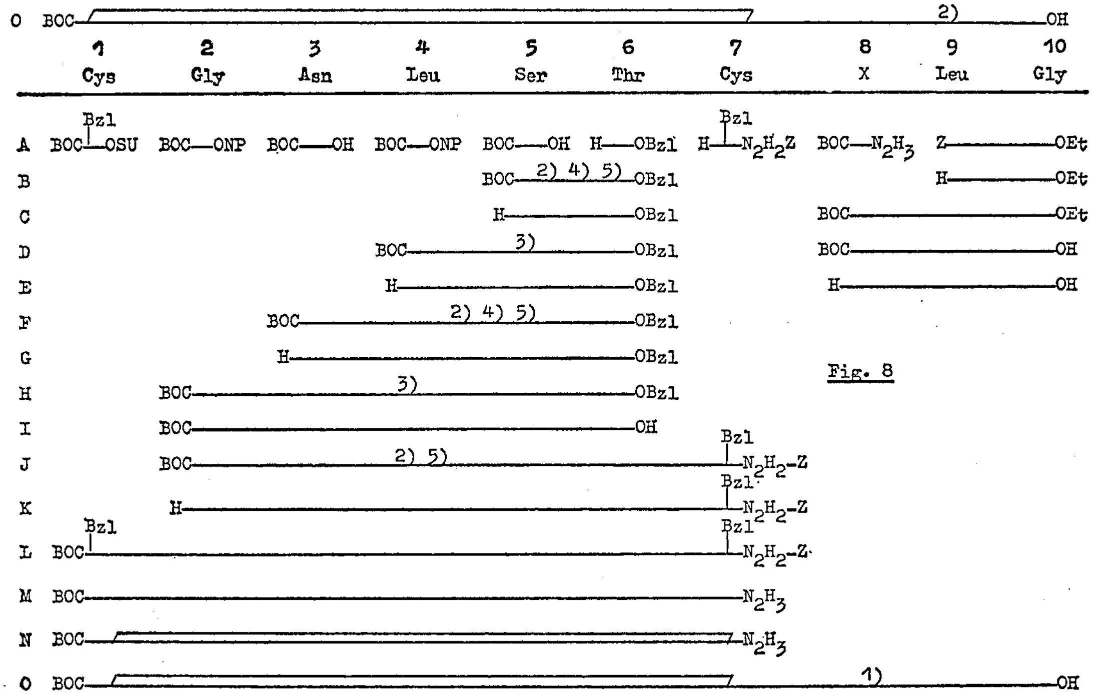

in which at least one and at most 16 of the aminoacids in the positions 2, 8, 10, 11, 12, 13, 14, 16, 18, 21, 23, 24, 25, 26, 27, 29, 30 and 31 are replaced by other natural α-amino-acids or their homologues are useful as hypocalcaemic agents and are prepared by splitting off groups protecting at least one amino group or carboxyl group or oxidizing the corresponding mercapto compounds to the disulfides or condensing together adequate peptides.

CROSS-REFERENCE TO RELATED APPLICATION

This is a continuation of application Ser. No. 864,544, filed Oct. 7, 1969 (now abandoned).

The present invention provides new hypocalcaemically active peptides of the formula (I)

1 2 3 4 5 6 7 8 9 10 11 12
H-Cys-Gly-Asn-Leu-Ser-Thr-Cys-Met-Leu-Gly-Thr-Tyr- 13 14 15 16 17 18 19 20 21 22 23 24
Thr-Gln-Asp-Phe-Asn-Lys-Phe-His-Thr-Phe-Pro-Gln- 25 26 27 28 29 30 31 32
Thr-Ala-Ile-Gly-Val-Gly-Ala-Pro-$NH_2$ in which at least one and at most 16 of the aminoacids in the positions 2, 8, 10, 11, 12, 13, 14, 16, 18, 21, 23, 24, 25, 26, 27, 29, 30 and 31 are replaced by other natural α-amino-acids or their homologues, especially by the aminoacids present in the corresponding positions of porcine thyrocalcitonine, their dimers, especially those in which 2 identical peptide sequences (1–32 and 1′–32′) are linked in an antiparallel arrangement via the cysteine residues 1,7′ and 7,1′ through a disulphide bond, and derivatives of the monomeric or dimeric peptides as well as acid addition salts and complexes of the said monomeric and dimeric peptides and their derivatives, and processes for the manufacture of these compounds.

Of special value are those peptides of the formula I, in which the aminoacid in position 8, methionine, is replaced by valine, norvaline, leucine, isoleucine, norleucine or α-aminobutyric acid and those which contain glycine in position 12 and/or 18, their dimers, derivatives and acid addition salts and complexes.

Derivatives of said compounds are primarily those in which the α-amino group is acylated, as well as corresponding desamino$^1$-peptides.

Acyl groups suitable for the acylation of the amino groups, especially for the acylation of the $N^\alpha$-amino group, are the residues of carboxylic acids such as aliphatic, aromatic, araliphatic, heterocyclic and heterocyclyl-aliphatic carboxylic acids, especially of lower mono- or dibasic alkane or alkene acids such as formic, acetic, propionic, a butyric, acrylic, succinic acid, of alicyclic carboxylic acids such as cycloalkylcarboxylic acids, of mono- or dibasic monocyclic aromatic carboxylic acids such as unsubstituted or substituted benzoic acid or phthalic acid, of unsubstituted and aryl-substituted aryl-lower alkyl or -alkenyl-carboxylic acids such as phenylacetic acid, of unsubstituted or substituted mono- or dibasic 5- or 6-membered heterocyclic acids with nitrogen, sulphur and/or oxygen as hetero atoms, such as pyridinecarboxylic acids, thiophenecarboxylic acids, or of heterocyclyl-lower alkanoic acids such as pyridylacetic acid, imidazolylacetic acid in which the rings are substituted, for example, by halogen atoms, nitro groups, lower alkyl or lower alkoxy groups or lower carbalkoxy groups. Further specially suitable acyl groups are the acyl residues of aminoacids, especially α-aminoacids, for example the pyroglutamyl residue; furthermore acyl radicals derived from carbonic or thiocarbonic acid or from their esters or amides, for example lower alkyloxycarbonyl groups such as ethoxycarbonyl, tertiary butoxycarbonyl; also benzyloxycarbonyl, carbamoyl or thiocarbamoyl which may be unsubstituted or substituted as indicated above, also N-substituted carbamoyl and thiocarbamoyl, for example N-lower alkylcarbamoyl, N-phenyl-carbamoyl and N-phenylthiocarbamoyl.

The acid addition salts are primarily salts of therapeutically acceptable acids such as hydrochloric, acetic, sulphuric, phosphoric acid or of sulphonic acids such as lower alkanesulphonic acids, benzenesulphonic or toluenesulphonic acid.

The complexes are compounds, whose structure has not yet been clarified, which are formed when certain inorganic or organic substances are added to long-chain peptides and prolong their active life. Such substances have been described for instance for ACTH and other adrenocorticotropically active peptides. There may be mentioned, for example, inorganic compounds derived from metals such as calcium, magnesium, aluminium, cobalt or especially from zinc, especially sparingly soluble salts such as the phosphates, pyrophosphates and polyphosphates as well as hydroxides of these metals; furthermore alkali metal polyphosphates, for example "Calgon N," "Calgon 322," "Calgon 188" or "Polyron B–12." Organic substances that prolong the activity are, for example, nonantigenic gelatin, for example polyoxygelatin, polyvinylpyrrolidone and carboxymethylcellulose, also sulphonic or phosphoric acid esters of alginic acid, dextran, polyphenols and polyalcohols, in the first place polyphloretine phosphate and phytic acid, also polymers and copolymers of aminoacids, for example protamine and polyglutamic acid.

The new compounds, especially those which in 8-position contain the aforementioned exchange amino-acids, have a hypocalcaemic action. They lower the plasma-calcium and -phosphate level of the blood of mammals, as was shown by experiments on Wistar rats.

The compounds also lower the plasma-calcium level of human blood on intravenous administration of 0.01 to 5 mg. in 0.1 molar acetate buffer of pH=4.6 and can therefore be used for treating hypercalcaemia.

The present process for the manufacture of the new monomeric or dimeric peptides, their derivatives, their acid addition salts and complexes is characterized in that (1) from a compound of the formula I 1 2 3 4 5 6 7 8 9 10 11 12 13 14 15
H-Cys-Gly-Asn-Leu-Ser-Thr-Cys-Met-Leu-Gly-Thr-Tyr-Thr-Gln-Asp- 16 17 18 19 20 21 22 23 24 25 26 27 28 29 30 31
Phe-Asn-Lys-Phe-His-Thr-Phe-Pro-Gln-Thr-Ala-Ile-Gly-Val-Gly-Ala- 32
Pro-$NH_2$ in which at least one and at most 16 of the aminoacids in positions 2, 8, 10, 11, 12, 13, 14, 16, 18, 21, 23, 24, 25, 26, 27, 29, 30 and 31 are replaced by other natural α-aminoacids or their homologues or corresponding dimers or derivatives of these peptides, in which compounds at least one amino group or a carboxyl group is protected by an eliminable protective group, the protective group(s) is/are eliminated; or (2) a compound of the formula II

```
 1   2   3   4   5   6   7   8   9  10  11  12  13  14  15
H-Cys-Gly-Asn-Leu-Ser-Thr-Cys-Met-Leu-Gly-Thr-Tyr-Thr-Gln-Asp-
16  17  18  19  20  21  22  23  24  25  26  27 28  29  30  31
Phe-Asn-Lys-Phe-His-Thr-Phe-Pro-Gln-Thr-Ala-Ile-Gly-Val-Gly-Ala-
32
Pro-NH2
```

in which at least one and at most 16 of the aminoacids in positions 2, 8, 10, 11, 13, 14, 16, 18, 21, 23, 24, 25, 26, 27, 29, 30 and 31 are replaced by other natural α-aminoacids, or their homologs, or an aforementioned derivative thereof in which compounds the mercapto groups are free or protected by the trityl group, is oxidized to form a disulfide, or (3) a compound of the formula III or IV

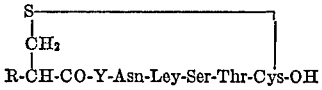

or (III)

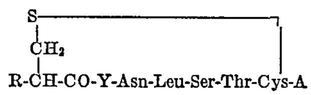

(IV)

in which Y represents glycyl or L-seryl, A stands for 1 to 21 of the aminoacid residues following upon cysteine[7] which may contain a protected side-chain amino group and which may have been exchanged in the manner indicated, and R represents hydrogen or an acylated amino group, is condensed with the remaining C-terminal sequence of the peptide with possibly protected side chain amino group (up to the C-terminal aminoacid L-proline-amide) by a method conventionally used in the peptide synthesis, and, if desired, the resulting monomeric compound is converted into its dimers or the free monomeric or dimeric peptides are converted into their derivatives and/or acid addition salts or complexes.

Protective groups used with special advantage in the manufacture of the starting materials for variant (1) of the present process, and also for all intermediates required in the 3 process variants, are those known from the synthesis of long-chain peptides as well as a few new protective groups that are easy to eliminate, for example by hydrolysis, reduction, aminolysis or hydrazinolysis.

Thus, for example, there are used as protective groups for amino groups acyl or aralkyl groups such as formyl, trifluoracetyl, phthaloyl, benzenesulphonyl, p-toluenesulphonyl, o-nitrophenylsulphenyl, 2,4-dinitrophenylsulphenyl groups (these sulphenyl groups can alternatively be eliminated by treatment with nucleophilic reagents, for example sulphites, thiosulphates; see Kamber and Rittel, Helv. Chim. Acta *51* (1968) 2061), benzyl groups which may be substituted, for example by lower alkoxy, especially o- or p-methoxy groups, or diphenylmethyl or triphenylmethyl groups, or groups derived from carbonic acid, such as arylmethyloxycarbonyl groups whose aromatic rings may be substituted for instance by halogen atoms such as chlorine or bromine, nitro groups, lower alkyl or lower alkoxy groups or chromogenic groups, for example azo groups, in which the methylene group may be substituted by a further aryl residue and/or one or if desired two lower alkyls, such as benzyl, benzhydryl or 2 - phenyl - isopropyloxycarbonyl groups, for example carbobenzoxy, p-bromo- or p-chloro-carbobenzoxy, p-nitrocarbobenzoxy or p-methoxy, carbobenzoxy, p-phenylazo-benzyloxycarbonyl and p - (p' - methoxyphenylazo)-benzyloxycarbonyl, 2 - tolyl - isopropoxycarbonyl and especially 2-(p-biphenylyl)-isopropoxycarbonyl [cf. Kamber and Rittel, Helv. Chim. Acta *51* (1968) 2061] also aliphatic oxycarbonyl groups such as adamantyloxycarbonyl, cyclopentyloxycarbonyl, trichloro-ethoxycarbonyl, tertiary amyloxycarbonyl or in the first place tertiary butyloxycarbonyl.

The amino groups can also be protected by formation of enamines obtained by reacting the amino group with a 1,3-diketone, for example benzoylacetone, acetylacetone or dimedone.

Carboxyl groups are protected, for example, by amide or hydrazide formation or by esterification. The amide and hydrazide groups may be substituted, the amide group for instance by the 3,4 - dimethoxybenzyl or bis-(p-methoxyphenyl)-methyl group, the hydrazide group for instance by the carbobenzoxy group, the trichlorethyloxycarbonyl group, the trifluoracetyl group, the trityl group, the tertiary butyloxycarbonyl group or the 2-(p-biphenylyl-isopropoxycarbonyl group. For the esterification there may be used, for example, lower, possibly substituted, alkanols such as methanol, ethanol, cyanomethyl alcohol, benzoylmethyl alcohol or especially tertiary butanol, furthermore aralkanols such as aryl-lower alkanols, for example benzyl or benzhydryl alcohols which may be substituted by lower alkyl or lower alkoxy groups or by halogen atoms, such as p-nitrobenzyl alcohol, p-methoxybenzyl alcohol or 2,4,6 - trimethylbenzyl alcohol, phenols and thiophenols which may be substituted by electron-attracting substituents, such as thiophenol, thiocresol, p-nitrothiophenol, 2,4,5- and 2,4,6 - trichlorophenol, pentachlorophenol, p-nitrophenol, 2,4-dinitrophenol, p-cyanophenol or p-methanesulphonylphenol, also, for example, N-hydroxysuccinimide, N-hydroxyphthalimide, N-hydroxypiperidine and 8-hydroxyquinoline.

The hydroxyl groups of the serine, threonine and tyrosine residues can be protected, for example, by esterification or etherification. Acyl residues suitable for the esterification are, for example, lower alkanoyl residues such as acetyl, aroyl residues such as benzoyl and in the first place residues derived from carbonic acid such as benzoyloxycarbonyl or ethyloxycarbonyl. Groups suitable for the etherification are, for example, benzyl, tetrahydropyranyl or tertiary butyl residues. Furthermore, the hydroxyl groups can be protected by the 2,2,2-trifluoro-1-tertiary butoxycarbonylamino or -1-benzyloxycarbonylaminoethyl groups (Weygand) described in Ber. *100* [1967], pages 3838–3849. However, the hydroxyl groups need not necessary be protected.

The mercapto groups of the cysteine residues are protected for instance by acylation or alkylation. The acylation may be carried out, for example, with the acetyl or benzoyl residue, the ethylcarbamyl residue of the (possibly substituted) carbobenzoxy residue. The alkylation may be carried out, for example, with the tertiary butyl- or benzylthiomethyl residue or a (possibly substituted) arylmethyl group such as benzyl, p-nitrobenzyl, diphenylmethyl, dimethoxybenzhydryl or trityl, also phenylcyclohexyl, thienyl-(2)-cyclohexyl; cf. Ber. *101* [1968], page 681. The imino group of histidine need not necessarily be protected, though it may be advantageous to protect it, for example by benzyl, trityl, carbobenzoxy, adamantyloxycarbonyl or the above-mentioned Weygand's groups.

In varient (1) of the present process it is advantageous to protect the carboxyl group of the side-chain with the tertiary butyl ester group for protecting the amino group of the side-chain the tertiary butyloxycarbonyl group, for the hydroxyl groups of the serine, threonine and tyrosine residues (if they are to be protected at all) the tertiary butyl ether group and, if desired, for protecting the imino group of histidine the 2,2,2-trifluoro-1- tertiary butyloxycarbonylaminoethyl group. If desired, all those protective groups can be eliminated in a single stage by acid hydrolysis, for example with trifluoroacetic or hydrochloric acid. In synthesizing the starting materials used in variant (1), that is the protected dotriaconta peptides with the use of protective groups eliminable with trifluoracetic or hydrochloric acid, the mercapto groups are preferably protected by benzylation or tritylation. The S-trityl groups can be eliminated from the protected peptide in an organic solution selectively (while retaining the groups eliminable with trifluoroacetic acid) with mercuric acetate and hydrogen sulphide. The S-benzyl groups can be eliminated from the protected peptide selectively with sodium in liquid ammonia. In either case the peptide containing free mercapto groups is obtained which can then be oxidized to the protected disulphide, for example with iodine in glacial acetic acid, or with diiodoethane in an organic solvent or with atmospheric oxygen in liquid ammonia. It is specially advantageous to protect the mercapto groups by trityl groups which are then eliminated from the protected peptide with iodine in methanol with simultaneous formation of the disulphide bridge; cf. Kamber and Rittel, Helv. Chim. Acta *51* (1968) 2061. The disulphide ring can be formed at a stage of a partial sequence containing the two cysteine residues, for example on the decapeptide 1–10, or at the stage of the dotriacontapeptide.

In variant (2) of the present process the open-chain peptide used as starting material is preferably likewise prepared with the protective groups indicated for variant (1). The S-trityl groups can be eliminated with trifluoracetic acid, and the free open-chain peptide can be oxidized in known manner with potassium ferricyanide in an aqueous solution or with iodine or with air in liquid ammona. Alternatively, the trityl groups can be eliminated as described above with iodine and methanol with simultaneous formation of the disulphide.

In the manufacture of N-acyl derivatives the acyl group may serve as amino protective group.

The resulting monomeric peptides can subsequently be converted in known manner into their dimers and vice versa and/or the monomeric or dimeric peptides into their derivatives, acid addition salts and/or complexes. The subsequent conversions can be performed in a suitable order, either singly or in combination.

Resulting monomeric may be converted into dimeric compounds, for example by treatment with mercapto compounds in a neutral or weakly acidic medium, for example by treatment with cysteine hydrochloride. The dimeric compounds can be converted into the monomeric compounds under basic conditions, for example with dilute ammonia.

For the manufacture of acyl derivatives the free peptide can be N-acylated in the usual manner, for example by reaction with a mixed anhydride or acid azide containing the desired acyl residue, or in the first place with an activated ester such as phenyl or substituted phenyl ester. If desired, the acylation can be carried out selectively so that only the α-amino group is acylated.

Acid addition salts are formed in known manner.

Complexes are likewise formed by known or equivalent methods.

Complexes with inorganic substances, such as sparingly soluble metal compounds, for example aluminium or zinc compounds, are preferably manufactured in a similar manner as known for ACTH, for example by reaction with a soluble salt of the metal concerned, for example zinc chloride or sulphate, and precipitation with an alkali metal phosphate and/or hydroxide. Complexes with organic compounds, such as polyoxygelation, carboxymethylcellulose, polyvinylpyrrolidone, polyphloretine phosphate, polyglutamic acid or the like are prepared by mixing these substances with the peptide in an aqueous solution. In an identical manner insoluble compounds with alkali metal polyphosphates can be prepared.

The invention includes also any variant of the present process in which an intermediate obtained at any stage thereof is used as starting material and any remaining step(s) is/are carried out or the process is discontinued at any stage thereof and/or in which a starting material is formed in situ and/or is used in form of a salt thereof.

The peptides used as starting materials are obtained by linking the aminoacids—if required or desired with the use of readily eliminable protective groups—in the indcated order singly or in form of preformed small peptide fragments, and possibly at a suitable stage the disulphide bridge is formed. It is advantageous to employ the suitable linking methods described in the literature for the manufacture of long-chain peptides, taking into consideration the disulphide bridge.

Accordingly, the aminoacid and/or peptide fragments are linked so, for example, that an aminoacid or peptide containing a protected α-amino group and an activated terminal carboxyl group is reacted with an aminoacid or a peptide containing a free α-amino group and a free or protected (for instance esterified or amidated) terminal carboxyl group, or an aminoacid or a peptide containing an activated α-amino group and a protected terminal carboxyl group is reacted with an aminoacid or a peptide containing a free terminal carboxyl group and a protected α-amino group. The carboxyl group can be activated for instance by conversion into an acid azide, anhydride or imidazolide or into an activated ester such as cyanoethyl ester, thiophenylester, p-nitrothiophenyl ester, thiocresyl, p - methanesulphonylphenyl, p - nitrophenyl, 2,4-dinitrophenyl, 2,4,5- or 2,4,6-trichlorophenyl, pentachlorophenyl, N - hydroxysuccinimide, N - hydroxyphthalimide, 8-hydroxyquinoline, N-hydroxypiperidine ester, or by reaction with a carbodiimide (optionally with addition of N-hydroxysuccinimide) or N,N′-carbonyldiimdazole or an isoxazolium salt, for example, Woodward's reagent, the amino group for instance by reaction with a phosphite. As the most frequently used methods there may be mentioned the carbodiimide method, the Weygand-Wüensch method (carbodiimide in the presence of N-hydroxysuccinimide), the azide method, the method of the activated esters and the anhydride method, also the Merrified method and the method of the N-carboxyanhydrides or N-thiocarboxyanhydrides.

Apart from the manufacture of the final products the invention includes also as a special object the manufacture of the starting materials, especially of the peptide fragment containing the disulphide bridge and its linking with the remainder of the peptide. When the aminoacid in position 10 to 12 is glycine, it is advantageous to start from a sequence that comprises the first 10 or 12 N-terminal aminoacids and to condense the whole remaining sequence with this N-terminus.

It is also possible to link the said N-terminal sequence with the fragment up to the 28th aminoacid (glycine) containing a free C-terminal carboxyl group and condense the octacosa-peptide with the tetrapeptide of the aminoacids 29–32. This condensation is performed, for example, by the Weygand-Wünsch method. When the condensation of the sequence 1–10 or 1–12 is carried out with the C-terminal sequence 11–32 or 13–32, the carbodiimide method or the Weygand-Wüensch is preferred.

In the following preferred variants of the manufacture of the peptide of the formula I are explained in which the 8th aminoacid, methionine, is replaced by valine, norvaline, leucine, isoleucine, norleucine or α-aminobutyric acid (this 8th aminoacid is represented by X in the Figures). The diagrams illustrate special working methods which, of course, can be replaced by equivalent methods.

The figures and abbreviations in the Figures and Examples have the following meanings:

(1): the azide method
(2): the method of the mixed anhydrides (3): the method of the activated esters, especially p-nitrophenyl ester (ONP) or hydroxysuccinimide ester (OSU)
(4): the carbodiimide method
(5): the Weygand-Wüensch method
BOC: tertiary butyloxycarbonyl
DPC: 2-(p-biphenylyl)-isopropoxycarbonyl
Z: carbobenzoxy
TRI: trityl
Bzl: benzyl
OtBu: tertiary butyl ester
OBzl: benzyl ester
ONB: p-nitrobenzyl ester
ONP: p-nitrophenyl ester
OMe: methyl ester
OEt: ethyl ester
OCP: 2,4,5-trichlorophenyl ester
tBu: tertiary butyl ether
Ac: acetyl
TFA: trifluoracetic acid
Abu: α-aminobutyric acid The N-terminal decapeptide (1–10), in which X has the meaning defined above, as the 8th aminoacid can be synthesized, for example, from the sequences 1–4 and 5–10, or 1–5 and 6–10, or 1–6 and 7–10, or 1–7 and 8–10, as shown in FIGS. 1 to 8, but it is also possible to use other fragments for synthesizing the sequence 1–10. The protective group for the α-amino group on cysteine[1] is preferably the tertiary butoxycarbonyl group or an equivalent group eliminable by acid hydrolysis, or, when an $N^{\alpha}$-acylated dotriacontapeptide is to be manufactured, the corresponding acyl, for example acetyl, group. Apart from this it is advantageous to use mercapto protective groups that can be eliminated selectively with respect to the $N^{\alpha}$-amino protective group (for example tertiary butyloxycarbonyl group) eliminable by acid hydrolysis, for instance the benzyl or trityl group. The terminal carboxyl group of the decapeptide need not necessarily by protected, for example it needs no protection when the condensation is performed by the azide or anhydride method. It is also possible to protect this group by esterification as indicated above, for example by esterification with methanol or ethanol (elimination of the ester group with dilute sodium hydroxide solution) or with benzyl alcohol or an analogue (elimination of the ester group, for example), with sodium in liquid ammonia). The amino groups of the intermediates are protected with the usual protective groups, for example carbobenzoxy, trityl, tertiary butyloxycarbonyl or 2-para-diphenyl-isopropyloxycarbonyl. The carboxyl groups of the intermediates are, if necessary, esterified in the usual manner. The hydroxyl groups of the serine and threonine residue can be protected by etherification, for example with tertiary butanol or an equivalent thereof.

The p-nitrobenzyl ester and benzyl ester groups can be eliminated with sodium in liquid ammonia or by hydrogenolysis in the presence of palladized carbon, the carbobenzoxy group likewise by hydrogenolysis; the N-trityl group with aqueous acetic acid, the tertiary butyloxycarbonyl group with trifluoracetic acid, the 2 - (p - biphenylyl) - isopropoxycarbonyl group with aqueous acetic acid or, for example, with a mixture of glacial acetic acid, formic acid of 82.8% strength and water (7:1:2), as described in Kamber and Rittel, Helv. Chim. Acta *51* (1968), 2061. The p-nitrobenzyl or methyl ester can be converted into the hydrazide with hydrazine hydrate. The methyl or ethyl ester group is hydrolyzed with dilute sodium hydroxide solution. The tertiary butyl ester is split with trifluoracetic acid, as is the tertiary butyl ether. The S-trityl groups are eliminated with mercuric acetate and sulphuretted hydrogen, the S-benzyl group with sodium in liquid ammonia, and any benzyl or p-nitrobenzyl ester groups are simultaneously eliminated. The cyclization to the disulphide is carried out, for example, by oxidation with 1,2-diiodoethane, the cyclization of the S-tritylated compounds with iodine in methanol.

Figure 9:
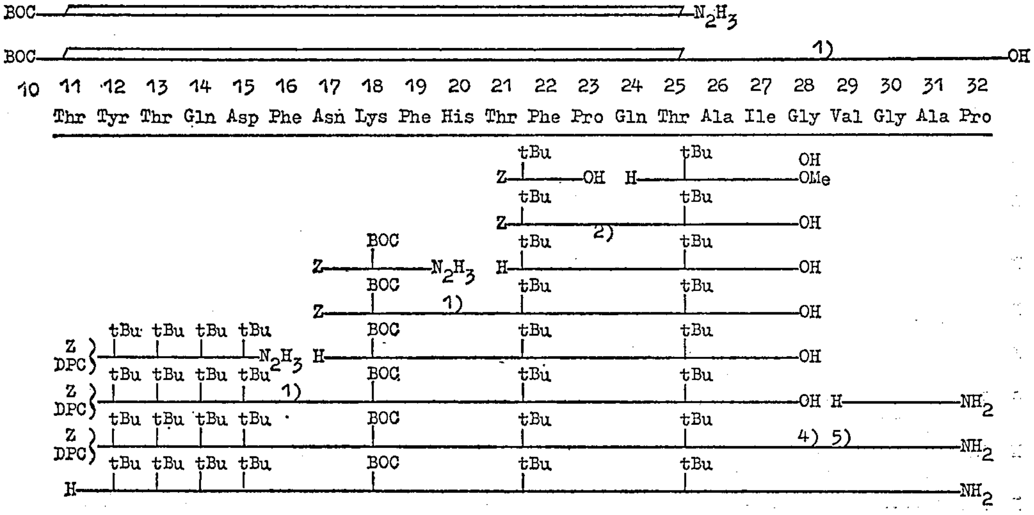

The C-terminal sequence comprising the aminoacids 11 to 32 or 11 to 28, to be linked with the N-terminal sequence is synthesized, for example, from the sequences 11–16, 17–20, 21–28 and 29–32, as shown in FIG. 9.

In the diagrams of FIG. 9 the hydroxyl groups of the threonine residues and of the tyrosine residue are protected, but this is not absolutely necessary. It is possible to link up also other sequences and to use other protective groups.

Figure 10:
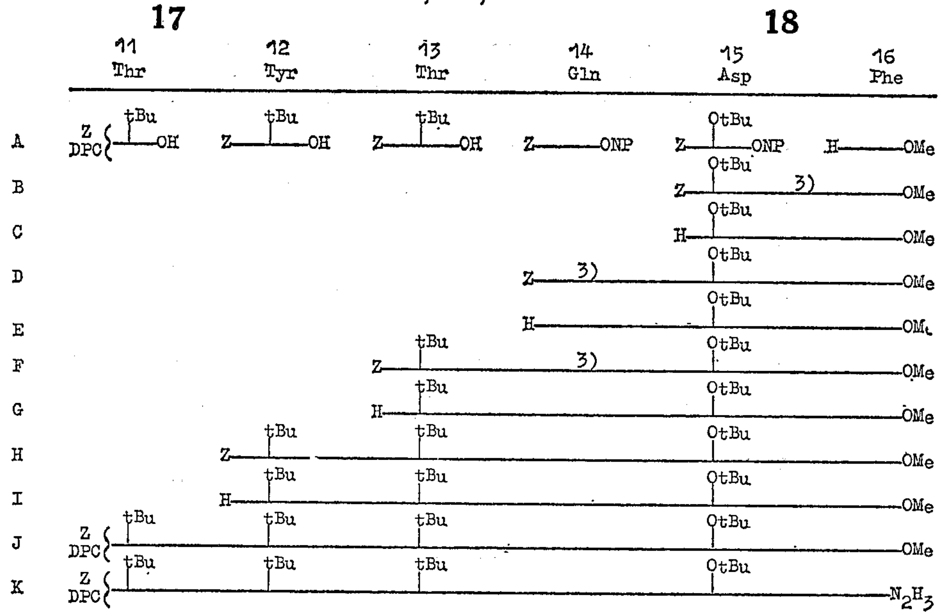

FIG. 10 illustrates the synthesis of the hexapeptide (in form of the hydrazide) of aminoacids 11–16. It can be linked with the sequence 17–28 or 17–32 by the azide method.

The sequence 17–28 can be synthesized from the fragments 17–20 and 21–28 by the azide method.

Figure 11:
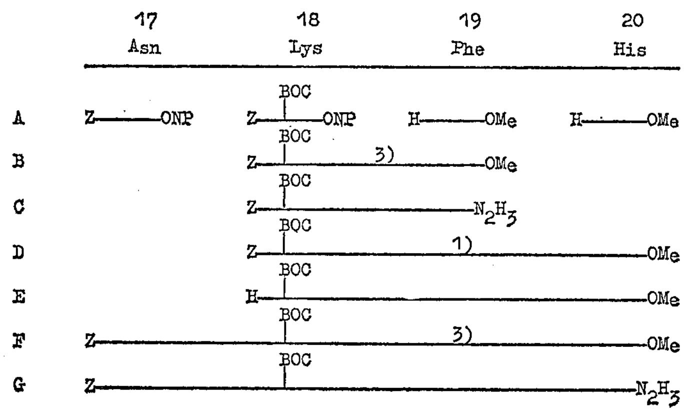
Figure 12:
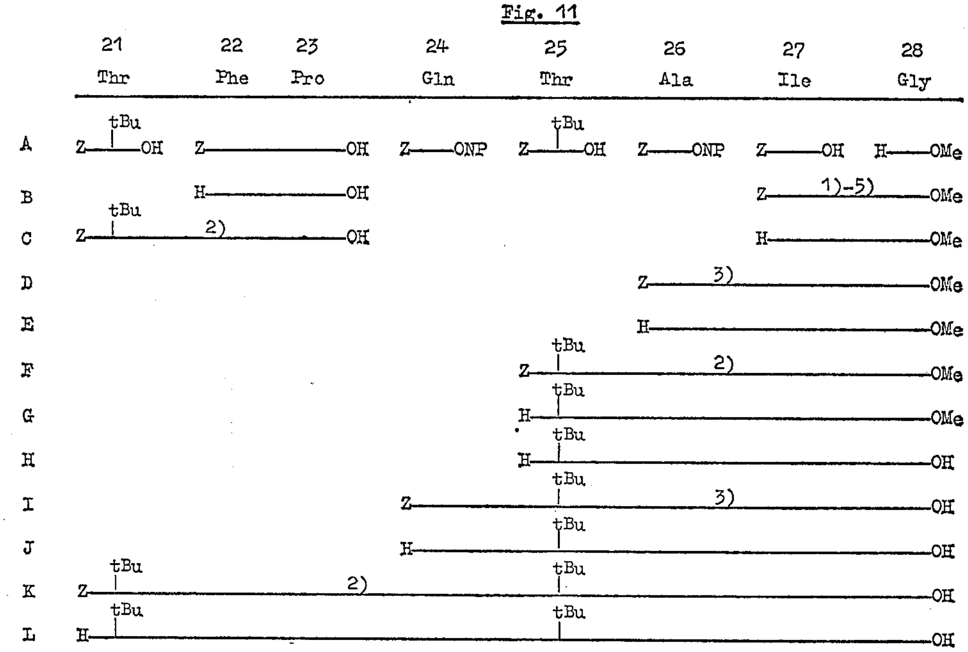

FIG. 11 illustrates the synthesis of the tetrapeptide hydrazide of the aminoacids 17–20. FIG. 12 shows the synthesis of the octapeptide 21–28. After having linked up the two sequences, the α-amino protective group is eliminated (the carbobenzoxy group by hydrogenolysis in the presence of palladium carbon) and the resulting dodecapeptide containing protected side-chains is condensed with the hexapeptide hydrazide 11–16 by the azide method (FIG. 10).

Figure 13:
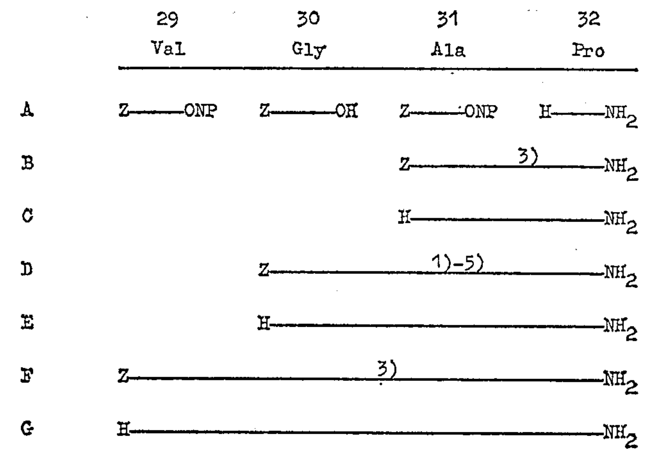

The resulting sequence 11–28 can be linked with the tetrapeptide amide of the aminoacids 29–32 which is manufactured as shown in FIG. 13, for example by the Weygand-Wuensch method; this gives rise to the protected docosapeptide amide 11–32, from which the α-amino protective group can be eliminated (carbobenzoxy for instance hydrogenolytically, DPC with 90% acetic acid or glacial acetic acid + 82.8% formic acid + water (7:1:2), and the resulting compound containing a free α-amino group can—after having removed the acetic acid—be linked with the N-terminal decapeptide (FIGS. 1–8), for example by the method of the mixed anhydrides, of the activated esters (OSU) or according to Weygand-Wuensch.

Alternatively, after elimination of its α-amino protective group, the sequence 11–28 can be linked with the N-terminal decapeptide by the method of the mixed anhydrides, and the resulting product can be condensed with the tetrapeptide amide 29–32, for example according to Weygand-Wuensch.

Figure 14:
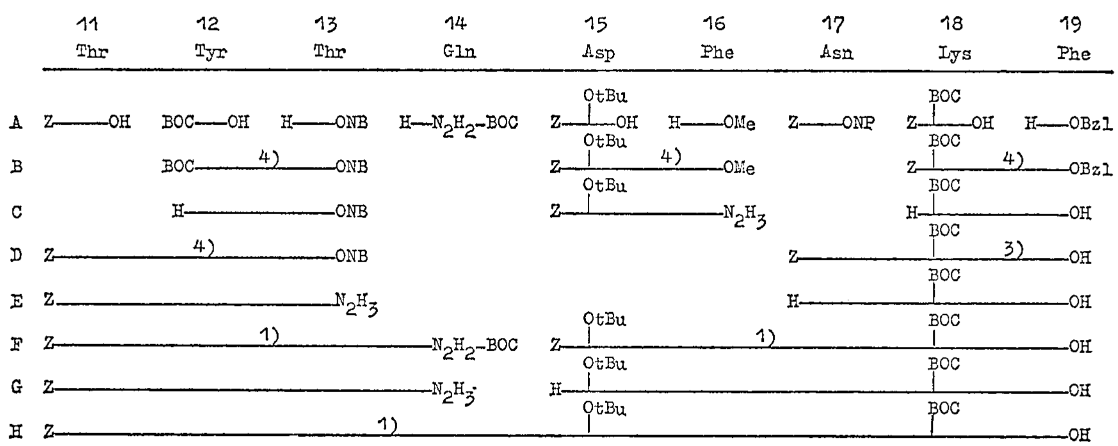
Figure 15:
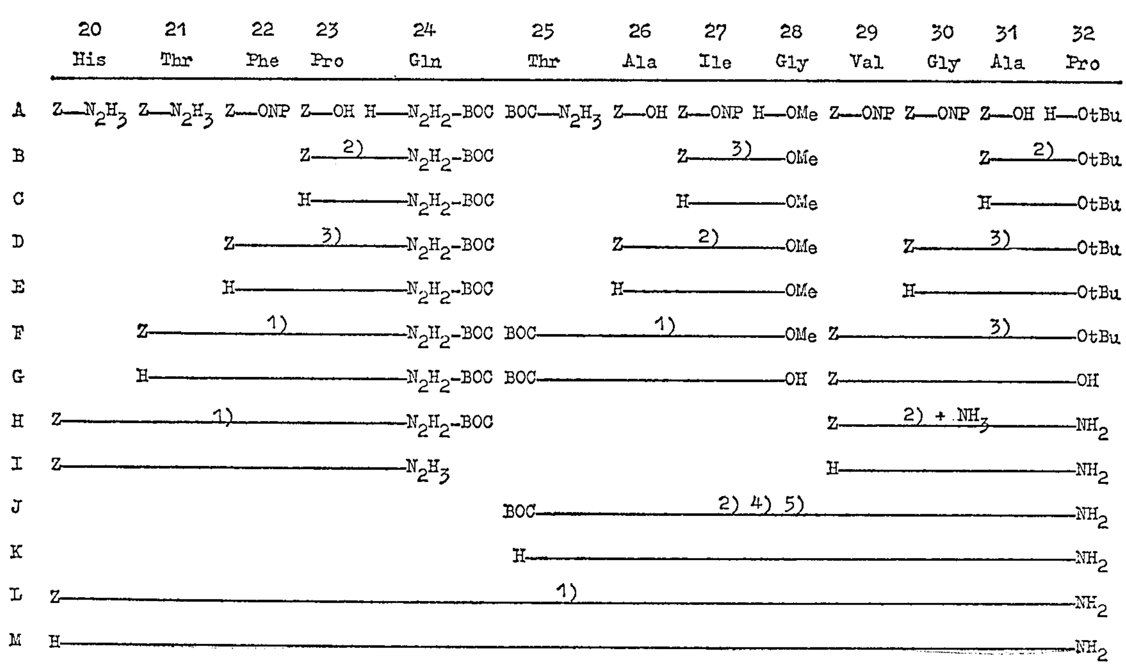

Another way of synthesizing the C-terminal sequence 11–32 is, for example, to synthesize it from the partial sequences 11–19 and 20–32, as shown in FIGS. 14 and 15, preferably by the method of the mixed anhydrides or according to Weygand-Wuensch.

From the protected dotriacontapeptide amide the protective groups are eliminated, for example with trifluoracetic acid, or with concentrated hydrochloric acid.

The dotriacontapeptide containing free or trityl-protected mercapto groups, to be used in variant (2) of the present process can be prepared as described above for the protected dotriacontapeptide, with the difference that the protected mercapto groups are retained to the end of the synthesis. Only when all other protective groups have been eliminated from the protected dotriacontapeptide are the mercapto protective groups eliminated or the tritylated compound is oxidized directly as mentioned above.

The synthesis according to variant (3) of the present process is specially suitable for the manufacture of final products containing acylated amino groups and in the first place also for the manufacture of α-desaminopeptides or α-acylated peptides in which the aminoacid 18, lysine, is exchanged for an aminoacid whose side-chain contains no acylatable amino group, for example for glycine or for the aminoacid 18 of porcine thyrocalcitonine, asparagine. The Nα-acylated decapeptide can be manufactured for instance as shown in FIG. 5 K, though it is also possible to use from the start the acyl group to be retained as amino protective group. The synthesis methods correspond to those described above.

Depending on the reaction conditions employed the new compounds are obtained in the form of bases or of their salts. The bases can be formed from the salts in known manner. When the bases are reacted with acids capable of forming therapeutically acceptable salts, they form salts, for example salts with inorganic acids such as hydrohalic acids, for example hydrochloric or hydrobromic acid, perchloric, nitric or thiocyanic acid, sulphuric or phosphoric acids, or with organic acids such as formic, acetic, propionic, glycollic, lactic, succinic, pyruvic, oxalic, malonic, maleic, fumaric, malic, tartaric, citric, ascorbic, hydroxymaleic, dihydroxymaleic, benzoic, phenylacetic, 4 - aminobenzoic, 4 - hydroxybenzoic, anthranilic, cinnamic, mandelic, salicylic, 4 - aminosalicylic, 2 - phenoxybenzoic, 2 - acetoxybenzoic, methanesulphonic, ethanesulphonic, hydroxyethanesulphonic, benzenesulphonic, p-toluenesulphonic, naphthalenesulphonic or sulphanilic acid.

The peptides obtained by the present process can be used in form of pharmaceutical preparations which contain the peptides in conjunction or admixture with a pharmaceutical organic or inorganic excipient suitable for enteral or parenteral administration. Suitable excipients are substances that do not react with the polypeptides, for example gelatin, lactose glucose, sodium chloride, starches, magnesium stearate, talcum, vegetable oils, benzyl alcohols, gums, polyalkyleneglycols, white petroleum jelly, cholesterol or other known medicinal excipients. The pharmaceutical preparations may be, for example, lyophilizates or in liquid form solutions, suspensions or emulsions. They may be sterilized and/or contain assistants such as preserving, stabilizing, wetting or emulsifying agents. They may also contain further therapeutically valuable substances.

The following Examples illustrate the invention.

In thin-layer chromatography the following systems are used:

43A: tertiary amyl alcohol+isopropanol+water (100:40:10)
43C: tertiary amyl alcohol+isopropanol+water (51:21:28)
45: secondary butanol+3% aqueous ammonia (70:30)
52: n-butanol+glacial acetic acid+water (75:7.5:21)
52A: n-butanol+glacial acetic acid+water (67:10:23)
79: n-butanol+pyridine+water (34:33:33)
87: isopropanol+glacial acetic acid+water (77:4:19)
89: ethyl acetate+acetone+water (72:24:4)
100: ethyl acetate+pyridine+glacial acetic acid+water (62:21:6:11)
102E: ethyl acetate+methylethylketone+glacial acetic acid+water (50:30:10:10)
107: ethyl acetate+pyridine+water (49:24:27)
115: ethyl acetate+pyridine+formic acid+water (63:21:10:6)
121A: isopropanol+26% ammonia+water (85:5:10)
system 1: benzene+ethanol (80:20)
system 2: benzene+ethanol (90:10)
system 4: n-amyl alcohol+formic acid+water (70:20:10)
system 5: n-butanol-glacial acetic acid+water (66.6:16.7:16.7)
system 6: n-butanol-pyridine-glacial acetic acid+water (66.6:12.5:4.2:16.7)
system 7: n-amyl alcohol+pyridine+water (70:20:10)
system 8: chloroform:methanol:glacial acetic acid (87.4:9.7:29)
system 9: benzene+ethanol (70:30)
system 10: benzene+ethanol (60:40)

Thin-layer chromatography is performed on silica gel or alumina ("Alox" D–0 from Messrs. Camag with 8% gypsum) or on cellulose ("Selecta 1440 from Messrs. Schleichter and Schuell).

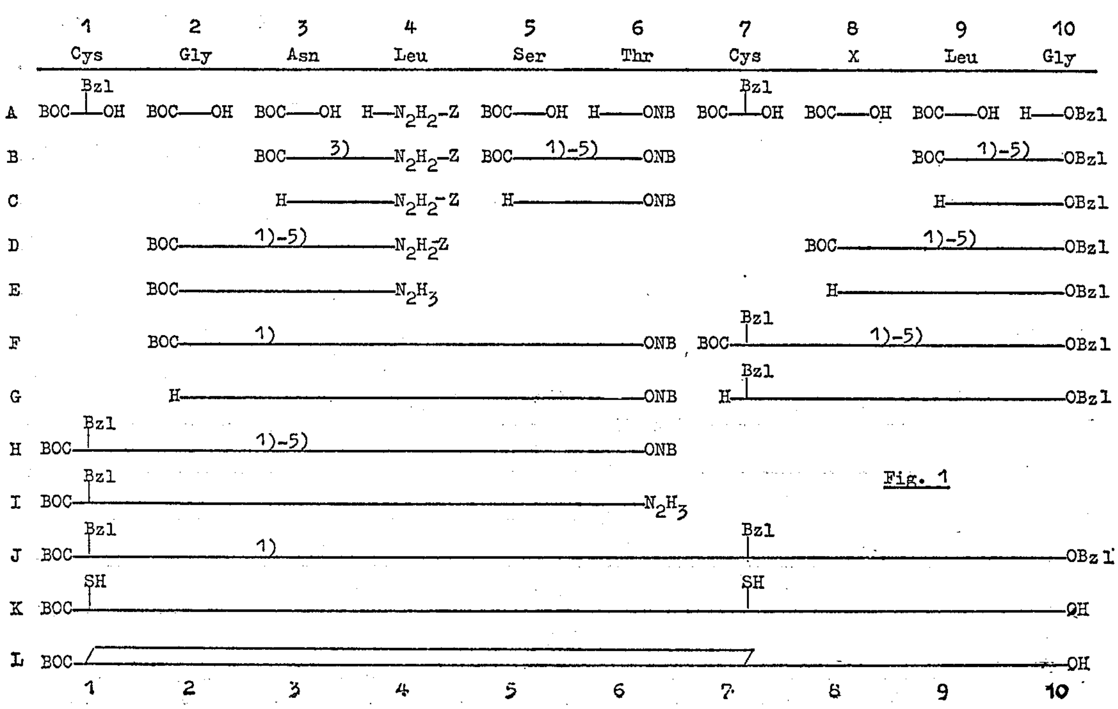

Fig. 1

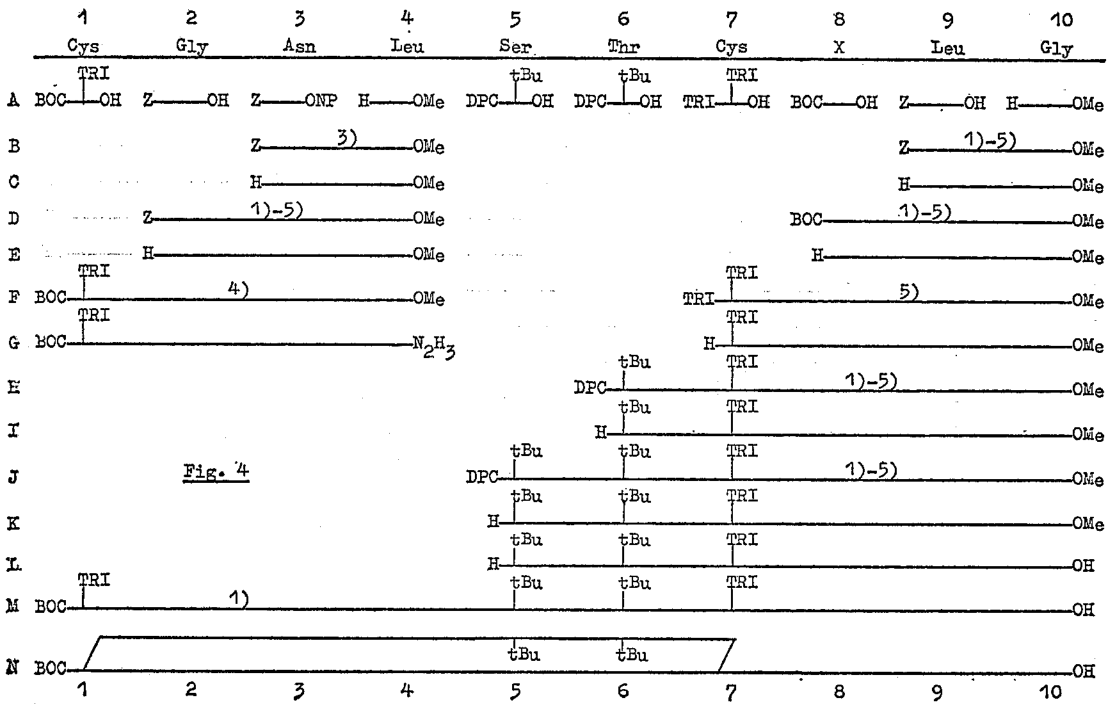
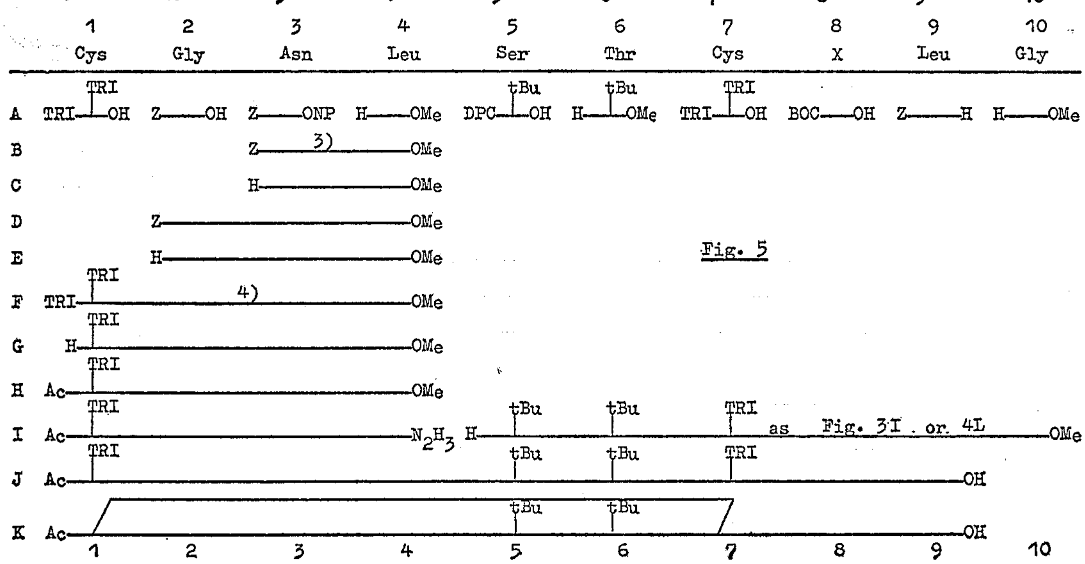
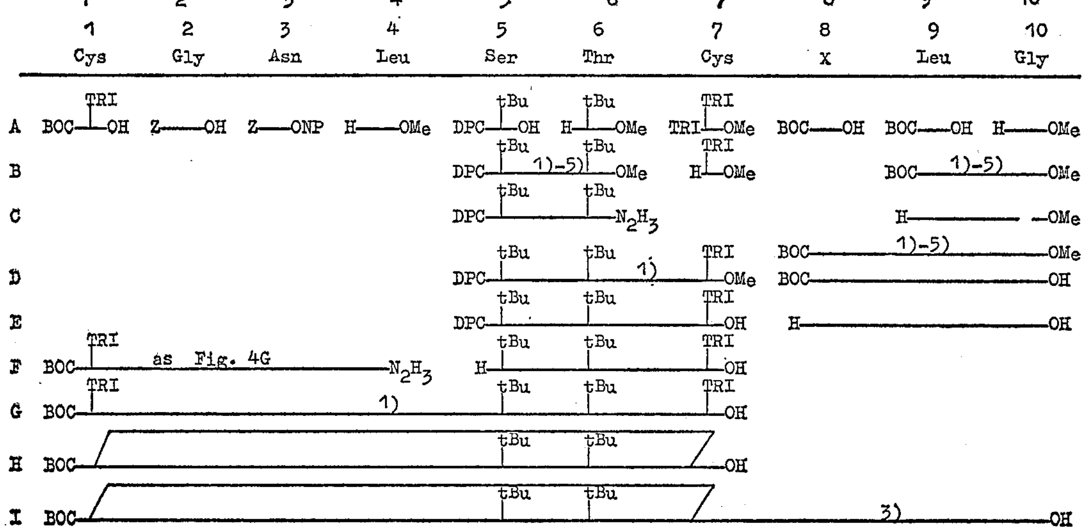
Fig. 6

EXAMPLE 1

H-Cys-Gly-Asn-Leu-Ser-Thr-Cys-Nle-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ (Nle[8]-calcitonine M)

500 mg. of finely powdered

BOC-Cys-Gly-Asn-Leu-Ser-Thr-Cys-Nle-Leu-Gly-Thr-Tyr-Thr-Gln-Asp(OtBu)-Phe-Asn-Lys(BOC)-Phe-His-Thr-Phe-Pro-Gln-Thr-Ala-Ile-Gly-Val-Gly-Ala-Pro-$NH_2$ are vigorously stirred into 10 ml. of ice-cold concentratea hydrochloric acid. After 10 minutes at 0° C. 50 ml. of water and 5 ml. of glacial acetic acid are added and the solution is freed from chlorine ions by filtration through a column of Merck ion exchange resin N°II, weakly basic, acetate form, the filtrate is mixed with o-octanol and evaporated to dryness; the residue is freed from octanol by being repeatedly washed with petroleum ether and decantation, dried, dissolved in 0.1 N-formic acid and purified by chromatography on a column (3.8 x 120 cm.) of Bio-Gel $P_6$. Fractions of 10 ml. each are collected and checked for purity by thin-layer chromatography on alumina (systems 52, 79 and 45), and the pure fractions are combined and lyophilized. In the thin-layer chromatogram on silica gel $Rf_6$=0.44; on alumina $Rf_{52}$=0.55; $Rf_{79}$=0.64; $Rf_{45}$=0.45.

The starting material can be prepared thus:

(1) Z-Ala-Pro-OtBu 68.85 g. of Z-Ala-OH are dissolved in 550 ml. of dimethylformamide after which 43.3 ml. of triethylamine are added. At −15° C. 30.8 ml. of ethylchloroformate are added and in 10 minutes the temperature is allowed to rise to −10° C.

Subsequently a solution of 52.65 g. of H-Pro-OtBu in 105 ml. of dimethylformamide is cooled to −10° C. and added.

After 30 minutes of stirring at −10° and 2½ hours at 20° C. the solution is stored overnight in a refrigerator after which the solvent is evaporated in vacuo at a temperature of 40° C. The residue is taken up in aqueous ethylacetate, the solution washed with 0.1 N hydrochloric acid, 10% sodium chloride solution, 5% sodium bicarbonate and again sodium chloride solution and dried over sodium sulphate, then evaporated to dryness in vacuo. $Rf_2$: 0.6.

(2) H-Al-Pro-OtBu, acetate 109 g. of Z-Ala-Pro-OtBu are dissolved in 649 ml. of methanol and the solution is hydrogenated in the presence of 4.1 ml. of glacial acetic acid and 3.1 g. of palladium carbon (10%). After filtration and evaporation of the solution to dryness the $Rf_7$ value of the product is 0.5.

(3) Z-Gly-Ala-Pro-OtBu 56.75 g. of Z-Gly-OH are dissolved in 675 ml. of tetrahydrofuran. The mixed anhydride is formed with 47.5 ml. of triethylamine and 27 ml. of ethylchloroformate and is allowed to react with 74 g. of H-Ala-Pro-OtBu, as described under 1 above. The product melts at 87–89° C.; $[\alpha]_D^{20}$=−62.9° (c.=1 in dimethylformamide). In the thin-layer chromatogram on silica gel $Rf_2$=0.50.

(4) H-Gly-Ala-Pro-OtBu 80 g. of Z-Gly-Ala-Pro-OtBu are dissolved in 800 ml. of methanol and hydrogenated as described under 2 above, but without acetic acid.

In the thin-layer chromatogram on silica gel the $Rf_5$ value of the product is 0.30.

(5) Z-Val-Gly-Ala-Pro-OtBu 54.7 g. of H-Gly-Ala-Pro-OtBu are suspended in 722 ml. of ethylacetate. After cooling to −10° C. 71.6 g. of Z-Val-ONP are added. The mixture is stirred for 1 hour at −10° C., 1 hour at 10° C. and 20 hours at 20° C. The reaction mixture is washed with 0.1 N hydrochloric acid, salt water, 20% potassium carbonate and again with saline. The organic layer is dried and the solvent distilled off in vacuo. The residual oil is washed with ethylacetate-hexane.

In the thin-layer chromatogram on silica gel $Rf_2$=0.4.

(6) Z-Val-Gly-Ala-Pro-OH 102 g. of Z-Val-Gly-Ala-Pro-OtBu are dissolved in 690 ml. of dry ethylacetate after which a current of hydrochloric acid gas is bubbled through for 1½ hours. The solvent is evaporated and the residue redissolved in ethyl acetate. After the addition of hexane and stirring for 1 hour at −10° C. the suspension is filtered. The product melts at 111° C. (with decomposition) $[\alpha]_D^{20}$=−38.3° (c.=2 in dimethylformamide). In the thin-layer chromatogram on silica gel $Rf_7$=0.50.

(7) Z-Val-Gly-Ala-Pro-$NH_2$ 64.4 g. of Z-Val-Gly-Ala-Pro-OH are dissolved in 644 ml. of dry tetrahydrofuran. The mixed anhydride is formed with 18.9 ml. of triethylamine and 13.5 ml. of ethylchloroformate as described under 1 above. 25 ml. of liquid ammonia are added and the reaction mixture is worked up as described under 1. The product melts at 208–211° C. $[\alpha]_D^{20}$=−32.7° (c.=2 in dimethylformamide). In the thin-layer chromatogram on silica gel $Rf_7$=0.7.

(8) H-Val-Gly-Ala-Pro-$NH_2$ sulfate 27.5 g. of Z-Val-Gly-Ala-Pro-$NH_2$ are suspended in 550 ml. of methanol and after adding of 3 ml. of 96% sulfuric acid hydrogenated as described under 2 above. In the thin-layer chromatogram on silica gel the product has an $Rf_5$ value of 0.2.

(9) Z-Ile-Gly-OMe 84.2 g. of H-Gly-OMe and 247 g. of Z-Ile-ONP are suspended in 2.4 liters of dimethylformamide, and after cooling to −10° C. 99 ml. of triethylamine are added. The mixture is worked up as described under 5 above. The product crystallizes from ethyl acetate-hexan. Melting point 126–128° C. $[\alpha]_D^{20}$= −27° (c.=3 in methanol). In the thin-layer chromatogram on silica gel $Rf_2$=0.50.

(10) H-Ile-Gly-OMe, sulfate 193 g. of Z-Ile-Gly-OMe are dissolved in 4860 ml. of methanol and 30 ml. of 96% sulfuric acid. Hydrogenation is carried out as described under 2 above. In the thin-layer chromatogram on silica gel $Rf_5$=0.56.

(11) Z-Ala-Ile-Gly-OMe 125.3 g. of Z-Ala-OH are dissolved in 1250 ml. of dimethylformamide. The mixed anhydride is prepared with 79.3 ml. of triethylamine and 55.7 ml. of ethylchloroformate and allowed to react with a solution of 168 g. of H-Ile-Gly-OMe, sulfate, in 835 ml. of dimethylformamide and 158.3 ml. of triethylamine as described under 1 above. The dimethylformamide is eliminated under reduced pressure to 100 ml. and the solution poured into 500 ml. of water. The product melts at 191.5–192.5° C. $[\alpha]_D^{20}$= −9.2 (c.=1 in dimethylformamide). In the thin-layer chromatogram on silica gel $Rf_1$=0.65.

(12) H-Ala-Ile-Gly-OMe, ½ $H_2SO_4$ 100 g. of Z-Ala-Ile-Gly-OMe are suspended in 824 ml. of dimethylformamide and 6.66 ml. of 96% sulfuric acid and hydrogenated as described under 2 above. In the thin-layer chromatogram on silica gel $Rf_5$=0.5.

(13) BOC-Thr-Ala-Ile-Gly-OMe 57.8 g. of BOC-Thr-NH-$NH_2$ are dissolved in 340 ml. of dimethylformamide and the solution cooled to −20° C. 250 ml. of 1.989 N-hydrochloric acid and then 33.5 ml. of iso-amyl-nitrite are added to the solution which is then stirred vigorously for 10 minutes. In the meantime, 105 ml. of triethylamine are added to a solution, cooled to −10° C., of 79.1 g. of H-Ala-Ile-Gly-OMe in 1500 ml. of dimethylformamide. This solution is cooled to −20° C. and the above solution of BOC-Thr-$N_3$ is added. The mixture is allowed to react for 70 hours at 0° C., the solvent is evaporated off at 40° C. under reduced pressure, the residue dissolved in ethyl acetate, the solution washed with 0.1 N hydrochloric acid, water, 5% sodium bicarbonate and water, then dried. The ethyl acetate is then removed under reduced pressure and the residue crystallised from ethyl acetate/hexane. The product melts at 187–189° C. $[\alpha]_D^{20}=-13.2°$ (c.=2 in dimethylformamide). In the thin-layer chromatogram on silica gel $Rf_1=0.68$.

(14) BOC-Thr-Ala-Ile-Gly-NH-$NH_2$ 87 g. of the BOC-tetrapeptidester are dissolved in 870 ml. of methanol after which the solution is cooled to 0° C. and 37.6 ml. of hydrazin hydrate are added. After 18 hours at room temperature the suspension was stirred for 1 hour at 0° C. and filtered. The residue is crystallised twice from methanol. Melting point 231–232.5° C. $[\alpha]_D^{20}=-5.9°$ (c.=2 in dimethylformamide). In the thin-layer chromatogram on silica gel $Rf_7=0.7$.

(15) BOC-Thr-Ala-Ile-Gly-Val-Gly-Ala-Pro-$NH_2$ 27.1 g. of BOC-Thr-Ala-Ile-Gly-NH-$NH_2$ are suspended in 250 ml. of dimethylformamide. The azide is prepared with 59.9 ml. of 2.23 N hydrochloric acid and 9.1 ml. of isoamylnitrite. The solution is stirred for 15 minutes.

24.2 g. of H-Val-Gly-Ala-Pro-$NH_2$, sulfate, are dissolved in 120 ml. of dimethylformamide and after cooling to 0° 28 ml. of triethylamine are added. After mixing with the azide the pH is brought up to 7. The mixture is allowed to react for 70 hours. The peptide is crystallised from ethylacetate/hexane. Melting point 226–227.5° C. $[\alpha]_D^{20}=-25.6°$ (c.=2 in dimethylformamide). In the thin-layer chromatogram on silica gel $Rf_7=0.7$.

(16) H-Thr-Ala-Ile-Gly-Val-Gly-Ala-Pro-$NH_2$, trifluoracetate 51 g. of BOC-Thr-Ala-Ile-Gly-Val-Gly-Ala-Pro-$NH_2$ are dissolved in 153 ml. of 90% aqueous trifluoro acetic acid. The solution was left for 1 hour and then 1530 ml. of dry ether are added. The precipitate obtained is filtered and washed three times with ether. Melting point 221–223° C. In the thin-layer chromatogram on silica gel $Rf_7=0.5$.

(17) Z-Pro-Gln-NH-NH-BOC 67.23 g. of Z-Pro-OH are dissolved in 670 ml. of dimethylformamide. Reaction with 38.9 ml. of triethylamine and 26 ml. of ethylchloroformate furnishes the mixed anhydride.

70.2 g. of H-Gln-NH-NH-BOC are allowed to react with this anhydride as described under 1 above. The residue is crystallised from hot ethylacetate. Melting point 169–171° C. $[\alpha]_D^{20}=-41.3°$ (c.=1 in dimethylformamide). In the thin-layer chromatogram on silica gel $Rf_1=0.45$.

(18) H-Pro-Gln-NH-NH-BOC 94 g. of the derivative described under 17 above are dissolved in 564 ml. of dimethylformamide and the solution is hydrogenated as described under 2, but without acid. In the thin-layer chromatogram on silica gel $Rf_5=0.3$.

(19) Z-Phe-Pro-Gln-NH-NH-BOC 80.4 g. of Z-Phe-ONP, 68 g. of H-Pro-Gln-NH-NH-BOC and 9.4 ml. of glacial acetic acid are dissolved in 560 ml. of dimethyl formamide as described under 5 above. The product melts at 107° C. $[\alpha]_D^{20}=-35.9°$ (c.=1 in dimethylformamide). In the thin-layer chromatogram on silica gel $Rf_1=0.7$.

(20) H-Phe-Pro-Gln-NH–NH-BOC 103 g. of Z-Phe-Pro-Gln-NH-NH-BOC are dissolved in 618 ml. of dimethylformamide and hydrogenated as described under 2 above, but without acid. In the thin-layer chromatogram on silica gel the product has an $Rf_6$ value of 0.5.

(21) Z-Thr-Phe-Pro-Gln-NH-NH-BOC 46.1 g. of Z-Thr-NH-$NH_2$ are suspended in 550 ml. of dimethylformamide. The azide is prepared with 177 ml. of 1.958 N hydrochloric acid in tetrahydrofuran and 24 ml. isoamylnitrite. The azide is coupled with 81.4 g. of H-Phe-Pro-Gln-NH-NH-BOC dissolved in 1200 ml. of dimethylformamide and 48.5 ml. of triethylamine. After crystallization from ethyl acetate+hexane the product melts at 129–134° C. $[\alpha]_D=-34.8°$ (c.=1 in dimethylformamide). In the thin-layer chromatogram on silica gel $Rf_7=0.85$.

(22) H-Thr-Phe-Pro-Gln-NH-NH-BOC 23.6 ml. of the tetrapeptide described under 21 are dissolved in 188 ml. of dimethylformamide and hydrogenated in the absence of acid. In the thin-layer chromatogram on silica gel $Rf_7=0.7$.

(23) Z-His-Thr-Phe-Gln-NH-NH-BOC 9.68 g. of Z-His-NH-$NH_2$ are dissolved in 100 ml. of dimethylformamide. The azide prepared with 36.3 ml. of 2.67 N hydrochloric acid in tetrahydrofuran and 4.32 ml. of isoamylnitrite is coupled with 19.32 g. of H-Thr-Phe-Pro-Gln-NH-NH-BOC dissolved in 300 ml. of dimethylformamide and 13.8 ml. of triethylamine. The reaction mixture is filtered, evaporated in vacuo to 100 ml. and poured into 1100 ml. of ethylacetate. The product melts at 95–133° C. In the thin-layer chromatogram on silica gel $Rf_6=0.7$.

(24) Z-His-Thr-Phe-Pro-Gln-NH-$NH_2$, HCl 11.4 g. of Z-His-Thr-Phe-Pro-Gln-NH-NH-BOC are dissolved in 57 ml. of 90% trifluoro acetic acid. The solution is left to stand for 1 hour and then 9.8 ml. of 4 N hydrochloric acid are added. The solution is poured into 570 ml. of dry ether. The residue is dried in vacuo over potassium hydroxide. In the thin-layer chromatogram on silica gel $Rf_5=0.25$.

(25) Z-His-Thr-Phe-Pro-Gln-Thr-Ala-Ile-Gly-Val-Gly-Ala-Pro-$NH_2$ 11 g. of the hydrazide described under 24 above are dissolved in 47 ml. of dimethylformamide. The azide is prepared with 15.6 ml. of 2.267 N hydrochloric acid and 1.57 ml. of amylnitrite as described under 13 above. The azide is allowed to react with 6 g. of the octapeptide amide described under 16 above, dissolved in 70 ml. of dimethylformamide and 5.5 ml. of triethylamine. The pH is 6.5. After 7 days the reaction mixture is filtered, the filtrate poured into 710 ml. of ethyl acetate and the residue stirred twice with ethyl acetate. The product melts at 186° C. with decomposition. In the thin layer chromatogram on silica gel $Rf_7=0.6$.

(26) Z-Lys(BOC)-Phe-OBzl 261.6 g. of Z-Lys(BOC)OH dicyclohexylammonium salt are suspended in 6.4 ml. of acetonitrile, 137.6 g. of H-Phe-OBzl.HCl are added and this suspension is stirred for 30 minutes. The mixture obtained is cooled to −5° after which 96 g. of dicyclohexylcarbodiimide are added. The suspension is stirred for 20 hours at room temperature, filtered and the residue washed with acetonitrile. The filtrate is evaporated in vacuo and the residue dissolved in ethylacetate, the solution washed with 0.1 N hydrochloric acid, water, 5% sodium bicarbonate and water. After drying the solvent is evaporated and the residue crystallised from ethylacetate/hexane. Melting point 101–103 C. $[\alpha]^{20}=-12.5°$ (c.=2 in dimethylformamide). In the thin-layer chromatogram on silica gel $Rf_2=0.55$.

(27) H-Lys(BOC-Phe-OH, HCl 105.4 g. of the above dipeptide ester are dissolved in 630 ml. of dimethylformamide and the solution hydrogenated as described under 2 above, but without glacial acetic acid. However, 150 ml. of 1.15 N hydrochloric acid in tetrahydrofuran are added after 2½ hours. The hydrogenation takes 20 hours. In the thin-layer chromatogram on silica gel the product has an $Rf_4$ value of 0.7.

(28) Z-Asn-Lys(BOC)-Phe-OH 76.2 g. of Z-Asn-ONP and 73.6 g. of H-Lys(BOC)-Phe-OH.HCl are dissolved in 850 ml. of dimethylformamide and 150 ml. of tetrahydrofuran. After cooling to −10° C. 47.8 ml. of triethylamine are added as described under 5. After a reaction time of 20 hours at 20° C. the reaction mixture is evaporated to 320 ml. of solvent and poured out into 1435 ml. of ethyl acetate and 359 ml. of 0.1 N hydrochloric acid. The precipitate is washed with water and ether. Melting point 167–168° C.

$$[\alpha]_D^{20}=-11.7°$$

(c.=2 in dimethylformamide). In the thin-layer chromatogram on silica gel $Rf_7$=0.7.

(29) H-Asn-Lys(BOC)-Phe-OH, HCl 34 g. of the above product are dissolved in 240 ml. of methanol and the solution hydrogenated as described under 27, except that 13.3 ml. of 2 N-hydrochloric acid in tetrahydrofuran are added after 2½ hours and another 13.3 ml. of hydrochloric acid in tetrahydrofuran after 20 hours. The solution is processed as it is. In the thin-layer chromatogram on silica gel $Rf_7$=0.6.

(30) Z-Asp(OtBu)-Phe-OMe 100.84 g. of Z-Asp(OtBu)-OH, dicyclohexylammonium salt are dissolved in 880 ml. of methylene chloride, 43.16 g. of H-Phe-OMe.HCl are added and stirring is continued for 10 minutes. The suspension is cooled to −5° C. after which 41.2 g. of dicyclohexylcarbodiimide in 120 ml. of methylene chloride are added and the batch is worked upon up as described under 26 above. The residue is washed with methylene chloride. In the thin-layer chromatogram on silica gel $Rf_1$=0.9.

(31) Z-Asp(OtBu)-Phe-NH-$NH_2$ 79.2 g. of the above dipeptide ester are dissolved in 1320 ml. of methanol, the solution is cooled to 0° C., and 21.1 ml. of hydrazine hydrate added as described under 14 above, but the reaction is allowed to proceed for 3 days. The residue is washed twice with water. Melting point 143–145° C. $[\alpha]_D^{20}=-22.2°$ (c.=2 in dimethylformamide). In the thin-layer chromatogram on silica gel $Rf_1$=0.65.

(32) Z-Asp(OtBu)-Phe-Asn-Lys(BOC)-Phe-OH 54.5 g. of Z-Asp(OtBu)-Phe-NH-$NH_2$ are dissolved in 325 ml. of dimethylformamide. The azide is prepared as described under 13 above with 111 ml. of 1.98 N hydrochloric acid in tetrahydrofuran and 14 ml. of isoamylnitrite. 53.4 g. of H-Asn-Lys(BOC)-Phe-OH.HCl are dissolved in 280 ml. of dimethylformamide and 50 ml. of triethylamine and added to the azide solution after cooling to −10° C.

The pentapeptide is precipitated by mixing the residue with ethyl acetate and washed with water+ethanol 15:1. Melting point 189–190° C. $[\alpha]_D^{20}=-21.8°$ (c=1 in dimethylformamide). In the thin-layer chromatogram on silica gel $Rf_6$=0.77.

(33) H-Asp(OtBu)-Phe-Asn-Lys(BOC)Phe-OH 9.6 g. of the protected pentapeptide obtained as described under 32 above are dissolved in 192 ml. of dimethylformamide and the solution hydrogenated as described under 27 above, except that 4.43 ml. of 2.3 N-hydrochloric acid in tetrahydrofuran are used. In the thin-layer chromatogram on silica gel the product has an $Rf_5$ value of 0.8.

(34) BOC-TyrThr-ONB 69.68 g. of H-Thr-ONH.HCl are suspended in 480 ml. of acetonitrile and 32.84 ml. of triethylamine are added. The mixture obtained is cooled to −5° C. followed by adding of 67.52 g. of BOC-Tyr-OH and 960 ml. of cooled acetonitrile. After adding 49.44 g. of dicyclohexylcarbodiimide the suspension is stirred for 1 hour at 3° C. and worked up as described under 26 above. The dipeptide is isolated as an oil. In the thin-layer chromatogram on silica gel $Rf_1$=0.60.

(35) H Tyr-Thr-ONB-HCl 121 g. of BOC-Tyr-Thr-ONB are dissolved in 1537 ml. of methylene chloride and 384 ml. of nitromethane and the further procedure described under 6 above is followed. HCl gas is passed through for 45 minutes and the suspension then stirred for 1 hour before it is filtered. The product melts at 226–227° C. In the thin-layer chromatogram on silica gel $Rf_1$=0.35.

(36) Z-Thr-Tyr-Thr-ONB 57.4 g. of Z-Thr-NH-$NH_2$ are suspended in 320 ml. of dimethylformamide and the azide formed with 220 ml. of 1.953 N-hydrochloric acid in tetrahydrofuran and 29 ml. of isoamylnitrite as described under 13 above. The azide solution is added to a solution of 98 g. of H-Tyr-Thr-ONB, HCl in 760 ml. of dimethylformamide and 91 ml. of triethylamine. The tripeptide derivative crystallizes from ethyl acetate+hexane. Melting point 111–118° C. $[\alpha]_D^{20}=-4.4°$ (c.=2 in dimethylformamide). In the thin-layer chromatogram on silica gel $Rf_1$=0.6.

(37) Z-Thr-Tyr-Thr-NH-$NH_2$ 114.2 g. of the above tripeptide ester are dissolved in 480 ml. of methanol. 48 ml. of hydrazine hydrate are added.

After 4 hours 1440 ml. of ethyl acetate are added and after 1½ hours the suspension is filtered. The residue is stirred for 20 hours with 1 l. of ethyl acetate. The product melts at 219–221° C. $[\alpha]_D^{20}=-6.6°$ (c.=2 in dimethylformamide). In the thin-layer chromatogram on silica gel $Rf_6$=0.85.

(38) Z-Thr-Tyr-Thr-Gln-NH-NH-BOC 89 g. of Z-Thr-Tyr-Thr-NH-$NH_2$ are suspended in 890 ml. of dimethylformamide. The azide is formed as described under 13 above with 197 ml. of 2.02 N hydrochloric acid in tetrahydrofuran and 26.8 ml. of isoamylnitrite and added to 39.3 g. of H-Gln-NH-NH-BOC and 56.2 ml. of triethylamine in 750 ml. of dimethylformamide cooled to −10° C. Reaction time: 4 days. After evaporating of the reaction mixture 720 ml. of methanol and 720 ml. of ether are added and the suspension stirred for 2 hours. The crystals are then filtered off and stirred with 400 ml. of 0.05 N-hydrochloric acid (twice). The product melts at 216–218° C. $[\alpha]_D^{20}=-8.3°$ (c.=2 in dimethylformamide). In the thin-layer chromatogram on silica gel $Rf_{10}$=0.8.

(39) Z-Thr-Tyr-Thr-Gln-NH-$NH_2$ 53.5 g. of the derivative described under 38 above are dissolved in 110 ml. of 90% trifluoracetic acid, the solution is stirred for 1½ hours, then treated with 880 ml. of ether as described under 16 above. The precipitate is stirred with 200 ml. of methanol+ether (1:4) (twice). The products melts at 200–203° C. $[\alpha]_D^{20}=-4.6°$ (c.=2 in dimethylformamide). In the thin-layer chromatogram on silica gel $Rf_5$=0.75.

(40) Z-Thr-Tyr-Thr-Gln-Asp(OtBu)-Phe-Asn-Lys(BOC)-Phe-OH 9.5 g. of Z-Thr-Tyr-Thr-Gln-NH-$NH_2$ are suspended in 95 ml. of dimethylformamide, and the azide is formed with 11.94 ml. of 2.122 N-hydrochloric acid in tetrahydrofuran and 2.28 ml. of isoamylnitrite as described under 13 above. 8.6 g. of H-Asp(OtBu)-Phe-Asn-Lys-(BOC)-Phe-OH are dissolved in 210 ml. of dimethylformamide and 7.5 ml. of triethylamine. This solution is cooled to −10° C. and added to the azide solution. The reaction is allowed to proceed for 3 days at 0° C. The batch is then filtered, the filtrate evaporated, and the residue stirred with 300 ml. of 0.1 N-hydrochloric acid. The product crystallizes from dimethylformamide and 0.1N-hydrochloric acid 1:3.5). It melts at 206° C. $[\alpha]_D^{20}=-19.3°$ (c.=1 in dimethylformamide). In the thin layer chromatogram on silica gel $Rf_5=0.87$.

(41) H-His-Thr-Phe-Pro-Gln-Thr-Ala-Ile-Gly-Val-Gly-Ala-Pro-$NH_2$ 32 g. of the BOC-tridecapeptideamide described under 25 above are dissolved in 1200 ml. of dimethylformamide and 12 ml. of 4 N-hydrochloric acid, and the solution is hydrogenated for 20 hours as described under 2 above. The filtrate is concentrated to 250 ml. and stirred with 1500 ml. of dry ether. The crude product is purified by counter-current distribution according to Craig in the system n-butanol+glacial acetic acid+water (4:1:5). K=0.11. $[\alpha]_D^{20}=-39.4°$ (c.=1 in dimethylformamide). In the thin-layer chromatogram on silica gel $Rf_6=0.2$.

(42) Z-Thr-Tyr-Thr-Gln-Asp(OtBu) - Phe - Asn - Lys (BOC)-Phe-His-Thr-Phe-Pro-Gln-Thr-Ala - Ile - Gly-Val-Gly-Ala-Pro-$NH_2$ 7.3 g. of the protected nonapeptide described under 40 above are dissolved in 75 ml. of dimethylformamide. 1.33 g. of N-hydroxysuccinimide are added, and the solution cooled to −22° C. A solution of 1.195 g. of dicyclohexylcarbodiimide in 15 ml. of dimethylformamide, likewise cooled to −22° C., is added (solution A). After stirring at −22° C. for 1 hour and at +4° C. for 5 hours, the suspension is again cooled to −22° C. A solution of 6.9 g. of the tridecapeptideamide described under 41 in 80 ml. of dimethylformamide is given a pH of 6.7 to 7 and cooled, then added to solution A. After a reaction period of 14 days the suspension is added to a fresh solution A, prepared from 0.73 g. of the nonapeptide described under 40 above. The reaction is allowed to proceed for another 7 days at 0° C., the suspension then filtered, and the filtrate evaporated to dryness under reduced pressure. The residue is purified by chromatography through a column of silica gel using the system n-butanol+glacial acetic acid+water (4:1:5). In the thin-layer chromatogram on silica gel the product has an $Rf_5$ value of 0.32.

(43) H-Thr-Tyr-Thr-Gln-Asp(OtBu) - Phe - Asn-Lys-(BOC)-Phe-His-Thr-Phe-Pro-Gln-Thr-Ala - Ile - Gly-Val-Gly-Ala-Pro-$NH_2$ 2 g. of the product described under 42 above are dissolved in 150 ml. of dimethylformamide and hydrogenated. After 2½ hours 0.3 ml. of 4.844 N hydrochloric acid are added. After 21 hours the solution is filtered and the filtrate is evaporated.

The residue is dissolved in 25 ml. of dimethylformamide, 0.73 ml. of 1.0 N hydrochloric acid is added. The solution is added to 40 ml. of ethyl acetate and cooled to 0° C. After filtration the residue is taken up in tertiary butanol-water and lyophilised. $[\alpha]_D^{20}=-25.2°$ (c.=2 in dimethylformamide). In the thin-layer chromatogram on silica gel $Rf_6=0.32$.

(44) BOC-Ser-Thr-OBzl 47.0 g. of H-Thr-OBzl.HCl in 300 ml. of methylene chloride are added to a solution of 73.8 g. of BOC-Ser-OH. Dicyclohexylammonium salt in 500 ml. of methylene chloride and the mixture stirred for 10 minutes at room temperature and then cooled to −5° C. A solution of 40.1 g. of dicyclohexylcarbodiimide in 90 ml. of methylene chloride is added dropwise at this temperature. The mixture is stirred for 3 hours at −5° C. and overnight at room temperature. After filtering off the dicyclohexylurea and dicyclohexylamine hydrochloride the solution is extracted by shaking three times with 0.1 N hydrochloric acid, twice with 20% strength sodium chloride solution, once with 10% strength sodium bicarbonate solution and twice with 20% strength sodium chloride solution and is dried over sodium sulphate. The solution is concentrated to about 600 ml., cooled to 5° C. and further dicyclohexylurea is filtered off. After evaporation to dryness, the residue is crystallised from ethyl acetate-hexane in order to purify it.

Melting point 110–111° C.; $[\alpha]_D=-8.5°$ (c.=2 in dimethylformamide); $Rf_2=0.33$ (on silica gel).

(45) H-Ser-Thr-OBzl.TFA 65.7 g. of BOC-Ser-Thr-OBzl are dissolved in 100 ml. of 90% strength trifluoracetic acid and the solution is left for one hour at 20° C. It is then added dropwise to 1000 ml. of dry ether whilst stirring and the mixture is stirred for one hour and left to stand overnight at −10° C. The resulting precipitate is filtered off and washed three times with dry ether and dried in vacuo over sodium hydroxide; melting point 128–129° C.; $Rf_7=0.65$; $Rf_4=0.50$ (on silica gel).

(46) BOC-Leu-Ser-Thr-OBzl 52.5 g. of H-Ser-Thr-OBzl.TFA are dissolved in 145 ml. of dimethylformamide and mixed at 0° C. with a solution of 48.0 g. of BOC-Leu-ONP. 21 ml. of triethylamine and 0.75 ml. of glacial acetic acid are then added. The reaction mixture is stirred for 3 hours at 0° C. and overnight at room temperature. After adding 2.1 litres of ethyl acetate the solution is extracted by shaking twice with water, twice with 0.1 N hydrochloric acid, twice with 10% strength sodium chloride solution, eight times with 20% strength potassium carbonate solution, twice with 10% strength sodium chloride solution and once with 30% strength sodium chloride solution. After drying over sodium sulphate the solution is concentrated to about 1.4 litres. The protected tripeptide of melting point 114–116° C. crystallises overnight in the refrigerator; $[\alpha]_D=-14°$ (c.=2 in dimethylformamide); $Rf_2=0.25$ (on silica gel).

(47) H-Leu-Ser-Thr-OBzl.TFA 46.1 g. of BOC-Leu-Ser-Thr-OBzl are dissolved in 92.5 ml. of 90% strength trifluoracetic acid and left for 1 hour at 20° C. Thereafter dry ether (925 ml.) is added whilst stirring, and the mixture is stirred for one hour at 0° C. and left to stand overnight at −10° C. The resulting precipitate is filtered off, washed three times with dry ether and dried in vacuo over sodium hydroxide. Melting point 168–171° C.; $Rf_7=0.80$ (on silica gel).

(48) BOC-Asn-Leu-Ser-Thr-OBzl 20.8 g. of BOC-Asn-OH are suspended in 208 ml. of acetonitrile, mixed with 22.7 g. of Woodward's Reagent K and the mixture stirred for 30 minutes at 20° C. 12.6 ml. of triethylamine are then added dropwise, whilst stirring, in such a way that the internal temperature does not exceed +32° C., and the mixture is cooled to 20° C. and stirred for a further 50 minutes at this temperature. The almost clear solution is cooled to 0° C. and is mixed with a solution, also cooled to 0° C., of 39.1 g. of H-Leu-Ser-Thr-OBzl.TFA and 10.5 ml. of triethylamine in 257 ml.

of dimethylformamide. The reaction mixture, which soon solidifies, is stirred overnight at room temperature, cooled to −10° C. and stirred for a further 2 hours at −10° C. Thereafter the crystalline precipitate is filtered off and the tetrapeptide derivative is washed once with cold acetonitrile, once with ethyl acetate and three times with water until it is free of chloride. The resulting product is crystallised from 370 ml. of dimethylformamide, 3.7 ml. of glacial acetic acid and 370 ml. of acetonitrile. Melting point 225–226° C.; $[\alpha]_D = -36°$ (c.=2 in dimethylformamide); $Rf_6=0.85$ (on silica gel).

(49) H-Asn-Leu-Thr-OBzl.TFA 32 g. of BOC-Asn-Leu-Ser-Thr-OBzl are dissolved in 192 ml. of 90% strength trifluoroacetic acid and the solution left for 45 minutes at 20° C. Thereafter the solution is concentrated to about 40 ml., mixed with 400 ml. of ether whilst stirring and stirred for 20 minutes at 35° C. under reflux. The crystal suspension is then cooled to −10° C. and is left to stand overnight at −10° C. The precipitate is filtered off, washed three times with ether and dried in vacuo over sodium hydroxide. Melting point 125–127° C.; $Rf_4=0.33$ (on silica gel).

(50) BOC-Gly-Asn-Leu-Ser-Thr-OBzl 26.3 g. of H-Asn-Leu-Ser-Thr-OBzl.TFA are dissolved in 100 ml. of dimethylformamide, the solution is cooled to 0° C. and successively mixed with 7.5 ml. of triethylamine, 0.54 ml. of glacial acetic acid and a solution of 14.4 g. of BOC-Gly-ONP in 100 ml. of dimethylformamide, stirred at room temperature until the mixture solidifies and left to stand for 2 days. Thereafter 300 ml. of ethyl acetate are added whilst stirring and the mixture left to stand overnight at −10° C. The precipitate is filtered off, washed twice with ethyl acetate and twice with ether, stirred for half an hour with 200 ml. of water, filtered off, washed with water and dried in vacuo. Melting point 227–228° C.; $[\alpha]_D = -23°$ (c.=2 in dimethylformamide); $Rf_9=0.50$ (on silica gel).

(51) BOC-Gly-Asn-Leu-Ser-Thr-OH 17.0 g. of BOC-Gly-Asn-Leu-Ser-Thr-OBzl are dissolved in 340 ml. of dimethylformamide whilst warming. After cooling to room temperature, 3.4 g. of 10% strength palladium on charcoal are added and the product is hydrogenated. The reduction is complete after 4 hours. After filtering off the catalyst the solution is concentrated in a high vacuum. Triturating three times with ether yields a pentapeptide which is homogeneous according to a thin layer chromatogram. Melting point 181–183° C.; $[\alpha]_D = -16.5°$ (c.=2 in dimethylformamide); $Rf_7=0.65$ (on silica gel).

(52) BOC-Gly-Asn-Leu-Ser-Thr-Cys(Bzl)-$N_2H_2$-Z 9.2 g. of H-Cys(Bzl)-$N_2H_2$-Z.HCl are dissolved in 300 ml. of freshly distilled dimethylformamide, mixed with 12.2 g. of BOC-Gly-Asn-Leu-Ser-Thr-OH and stirred at room temperature until solution has occurred. The solution is then cooled to 0° C., 3.28 ml. of triethylamine and 4.88 g. of N-hydroxysuccinimide in 100 ml. of dimethylformamide are added, the mixture is further cooled to −22° C. and 4.36 g. of dicyclohexylcarbodiimide in 30 ml. of dimethylformamide are added. The mixture is stirred for one hour at −22° C., the internal temperature is then allowed to rise gradually, the mixture stirred for a further 3 days at room temperature, the precipitated dicyclohexylurea filtered off and the filtrate evaporated to dryness in a high vacuum. The residue is stirred with a mixture of ethyl acetate and 5% strength citric acid solution and the precipitate is filtered off, washed with water, dried in vacuo, stirred with dry ether, filtered and dried in a high vacuum. Melting point 173–178° C.; $[\alpha]_D = -25.5°$ (c.=2 in dimethylformamide); $Rf_1=0.21$ (on silica gel).

(53) H-Gly-Asn-Leu-Ser-Thr-Cys(Bzl)-$N_2H_2$-Z.TFA 13 g. of BOC-Gly-Asn-Leu-Ser-Thr-Cys(Bzl)-$N_2H_2$-Z are dissolved in 130 ml. of 90% strength trifluoracetic acid and the solution is left to stand for 2 hours at 22° C. It is then concentrated and the residue stirred three times with ether and dried in vacuo over sodium hydroxide. Melting point 159–161° C. ($Rf_6=0.63$ (on silica gel).

(54) BOC-Cys(Bzl)-Gly-Asn-Leu-Ser-Thr-Cys(Bzl)-$N_2H_2$-Z 6.69 g. of BOC-Cys(Bzl)-OSU and 12.2 g. of H-Gly-Asn-Leu-Ser-Thr-Cys(Bzl)-$N_2H_2$-Z. 1.22 TFA are dissolved in 100 ml. of dimethylformamide. Triethylamine is added dropwise from a solution of 150 mMols of triethylamine in 100 ml. of dimethylformamide, whilst stirring, until the reaction mixture shows a pH value of 6.4 on moist indicator paper. The solution is stirred for 3 days at room temperature and thereafter evaporated to dryness in a high vacuum. The residue is twice stirred with 300 ml. of ethyl acetate thereafter stirred three times with a mixture of 150 ml. of ethyl acetate and 30 ml. of 5% strength citric acid solution, filtered off, dried in vacuo and crystallised from dimethylformamide-ethyl acetate. Melting point 191–193° C.; $[\alpha]_D = -31.5°$ (c.=2 in dimethylformamide); $Rf_8=0.35$ (on silica gel).

(55) BOC-Cys-Gly-Asn-Leu-Ser-Thr-Cys-$N_2H_3$ 6 g. of BOC-Cys(Bzl)-Gly-Asn-Leu-Ser-Thr-Cys(Bzl)-$N_2H_2$-Z are dissolved at −40° C. in 700 ml. of dry liquid ammonia. 973 mg. of sodium are added at the boiling point of the ammonia, whilst stirring, in such a way that the colour of the reaction mixture only becomes light blue. After 25 minutes the reduction is complete. The mixture is stirred for a further 10 minutes with the blue colouration being retained, 2.4 ml. of glacial acetic acid are then added and the mixture evaporated to dryness in a high vacuum (about 1 mm.). The residue is stirred with 12 ml. of water, 3.2 ml. of glacial acetic acid and 20 ml. of ethyl acetate for one hour at 0° C. and the precipitate is filtered off, twice washed with 10 ml. of 1% strength acetic acid solution and once with 10 ml. of ethyl acetate and dried in a high vacuum. $Rf_5=0.65$ (on silica gel).

(56) BOC-Cys-Gly-Asn-Leu-Ser-Thr-Cys-$N_2H_3$ 1.0 g. of BOC-Cys-Gly-Asn-Leu-Ser-Thr-Cys-$N_2H_3$ is dissolved in 100 ml. of dimethylformamide and 500 ml. of water containing 1.23 milliequivalent of hydrogen chloride. The pH-value of the solution is adjusted to 6.8 by means of 3.7 ml. of an 0.43 N potassium hydroxide solution. 247 ml. of an 0.01 M potassium ferricyanide solution and 4.9 ml. of an 0.43 N potassium hydroxide solution are simultaneously added dropwise with stirring over the course of 90 minutes whilst maintaining this pH-value. The mixture is stirred for a further 90 minutes at room temperature and the pH-value of the solution is then brought to 4.0 by means of 0.7 ml. of glacial acetic acid. The solution is thereafter stirred with 50 ml. of Dowex-2-X8, acetate form and subsequently with 13 ml. of Dowex-50W-X8, $H^+$ form, the mixture filtered and the filtrate evaporated to dryness. The residue is dissolved in 50% strength t-butanol, lyophilised and dried in a high vacuum. The product contains about 15% of potassium acetate. It is homogeneous in a thin layer chromatogram on silica gel: $Rf_5=0.63$; $Rf_6=0.70$; $Rf_7=0.75$.

(57) H-Leu-Gly-OEt.HCl 14 g. of Z-Leu-Gly-OEt [manufactured according to J. R. Vaughan and R. L. Osato, J. Am. Chem. Soc. *73*, 5553 (1951)] are dissolved in 150 ml. of absolute ethanol, mixed with 11.5 ml. of a 6.9 N hydrogen chloride solution in ethanol and hydrogenated in the presence of 2.8 g. of palladium on charcoal (10% Pd). After 1 hour the catalyst is filtered off and the filtrate evaporated in vacuo at 40° C. bath temperature. The residue is an oil and is directly processed further. $Rf_1=0.50$ (on silica gel).

(58) BOC-Nle-Leu-Gly-OEt

As described under 1 above, the mixed anhydride is prepared from 4.63 g. of BOC-Nle-OH, 2.82 ml. of triethylamine and 1.9 ml. of ethylchloroformate in 50 ml. of tetrahydrofuran and coupled with 5.05 g. of H-Leu-Gly-OEt.HCl in 50 ml. of tetrahydrofuran.

The residue is crystallised from ethyl acetate-petroleum ether (40:60). Melting point 126–127° C. $[\alpha]_D^{20}=-28.3°$ (c.=1 in dimethylformamide.) In the thin-layer chromatogram on silica gel $Rf_1=0.7$.

(59) BOC-Nle-Leu-Gly-OH 3.25 g. of the ester described under 58 above are dissolved in 100 ml. of methanol, and 21 ml. of 0.53 N sodium hydroxide are added. After stirring for 1½ hours the solution is acidified and evaporated in vacuo. The residue is dissolved in water and extracted with ethyl acetate. The organic layer is dried and evaporated. The product melts at 71–72° C. $[\alpha]_D^{20}=-28.4°$ (c.=1 in dimethylformamide). In the thin-layer chromatogram on silica gel $Rf_7=0.75$.

(60) H-Nle-Leu-Gly-OH 2.42 g. of BOC-Nle-Leu-Gly-OH are dissolved in 24 ml. of 90% trifluoracetic acid as described under 16 above. After 1 hour the solution is evaporated. The product melts at 94–96° C. In the thin-layer chromatogram on silica gel $Rf_7=0.56$.

(61)

BOC-Cys-Gly-Asn-Leu-Ser-Thr-Cys-Nle-Leu-Gly-OH 1.0 g. of the hydrazide described under 56 above is dissolved in 35 ml. of dimethylformamide. The azide is prepared as described under 13 above with 0.85 ml. of 3.64 N hydrochloric acid in tetrahydrofuran and 0.155 ml. of isoamylnitrite and added to a solution of 0.955 g. of H-Nle-Leu-Gly-OH and 0.324 ml. of triethylamine in 25 ml. of dimethylformamide. The reaction mixture is evaporated and twice stirred with ethyl acetate/citric acid solution. In the thin-layer chromatogram on silica gel $Rf_5=0.71$.

(62)

BOC-Cys-Gly-Asn-Leu-Ser-Thr-Cys-Nle-Leu-Gly-Thr-Tyr-Thr-Gln-Asp(OtBu)-Phe-Asn-Lys(BOC)-Phe-His-Thr-Phe-Pro-Gln-Thr-Ala-Ile-Gly-Val-Gly-Ala-Pro-$NH_2$ 440 mg. of the BOC-decapeptide described under 61 above and 109 mg. of N-hydroxysuccinimide are dissolved in 35 ml. of dimethylformamide. The solution is cooled to −22° C., 98 mg. of dicyclohexylcarbodiimide are added, and the whole stirred at −22° C. for 1½ hours and at 0° C. for 3½ hours. The batch is then cooled to −22° C. and 850 mg. of the docosapeptideamide described under 43 are added, and the pH adjusted to 6.6 with triethylamine. After 7 days at 0° C. and 5 days at 22° C. the solution is evaporated to dryness under reduced pressure and the residue chromatographed over silica gel using the system n-butanol-glacial acetic acid-water (4:1:5). In the thin-layer chromatogram on silica gel $Rf_5=0.29$.

EXAMPLE 2

H-Cys-Gly-Asn-Leu-Ser-Thr-Cys-Val-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ (Val[8]-calcitonine M)

70 mg. of

BOC-Cys-Gly-Asn-Leu-Ser-Thr-Cys-Val-Leu-Gly-Thr-Tyr-Thr-Gln-Asp(OtBu)-Phe-Asn-Lys(BOC)-Phe-His-Thr-Phe-Pro-Gln-Thr-Ala-Ile-Gly-Val-Gly-Ala-Pro-$NH_2$ are dissolved in 3 ml. of ice-cold trifluoracetic acid of 95% strength and the solution is heated to 25° C. After 1 hour at 25° C. the solution is poured into 70 ml. of ice-cold ether and the resulting precipitate is suctioned off, repeatedly washed with ether, dried and dissolved in 5% acetic acid. To remove trifluoracetate ions the whole is filtered through Merck ion exchange resin N°II (weakly basic, acetate form). The eluate is lyophilized. The resulting dotriacontapeptide is not quite unitary according to its thin-layer chromatogram (alumina plates, systems 52 and 45); it can be purified by counter-current distribution in the system n-butanol+glacial acetic acid+water (4:1:5). In the thin-layer chromatogram on silica gel $Rf_6=0.45$ on alumina $Rf_{52}=0.53$; $Rf_{45}=0.42$.

The starting material can be prepared as follows:

(1) BOC-Cal-Leu-Gly-OEt 4.35 g. of BOC-Val-OH are dissolved in 50 ml. of tetrahydrofuran and the mixed anhydride is formed as described under 58 in Example 1, and coupled with 5.06 g. of H-Leu-Gly-OEt (Example 1, 57). The product melts at 112–113° C. $[\alpha]_D^{20}=-27.3°$ (c.=1 in dimethylformamide). In the thin-layer chromatogram on silica gel $Rf_1=0.7$.

(2) BOC-Val-Leu-Gly-OH

BOC-Val-Leu-Gly-OEt is hydrolysed in the same manner as described under 59 in Example 1. The product melts at 78° C. $[\alpha]_D^{20}=-24.7°$ (c.=1 in dimethylformamide). In the thin-layer chromatogram on silica gel $Rf=0.71$.

(3) H-Val-Leu-Gly-OH 2.9 g. of BOC-Val-Leu-Gly-OH are dissolved in 24 ml. of 90% trifluoracetic acid as described under 60 in Example 1. The product melts at 75° C. In the thin-layer chromatogram on silica gel $Rf_7=0.5$.

(4)

BOC-Cys-Gly-Asn-Leu-Ser-Thr-Cys-Val-Leu-Gly-OH 1 g. of the hydrazide described in Example 1 under 56 is converted into the azide as described under 61 in Example 1. The azide is condensed with 0.933 g. of H-Val-Leu-Gly-OH. In the thin-layer chromatogram on silica gel the product shows an $Rf_5$ value of 0.71.

(5)
BOC-Cys-Gly-Asn-Leu-Ser-Thr-Cys-Val-Leu-Gly-Thr-Tyr-Thr-Gln-Asp(OtBu)-Phe-Asn-Lys(BOC)-Phe-His-Thr-Phe-Pro-Gln-Thr-Ala-Ile-Gly-Val-Gly-Ala-Pro-$NH_2$ 440 mg of the docosapeptideamide described under 43 in Example 1 are condensed in the same manner as described under 62 in Example 1 with BOC-Cys-Gly-Asn-Leu-Ser-Thr-Cys-Val-Leu-Gly-OH.

In the thin-layer chromatogram on silica gel $Rf_5=0.29$.

EXAMPLE 3

H-Cys-Gly-Asn-Leu-Ser-Thr-Cys-Leu-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ (Leu[8]-calcitonine M)

200 mg. of

BOC-Cys-Gly-Asn-Leu-Ser(tBu)-Thr(tBu)-Cys-Leu-Leu-Gly-Thr-(tBu)-Tyr(tBu)-Thr(tBu)-Gln-Asp-(OtBu)-Phe-Asn-Lys(BOC)-Phe-His-Thr(tBu)-Phe-Pro-Gln-Thr(tBu)-Ala-Ile-Gly-Val-Gly-Ala-Pro-$NH_2$ are covered with 3.5 ml. of ice-cold trifluoracetic acid of 95% strength; when the peptide derivative has completely dissolved, the mixture is heated to 30° C. and kept for 1 hour, and then poured into 200 ml. of ice-cold ether. The fine precipitate is suctioned off, dried under vacuum over sodium hydroxide, dissolved in dilute acetic acid and freed from trifluoracetate ions by filtration through a column of Merck ion exchange resin N°II, weakly basic. The eluate is lyophilized and furnishes the acetate of Leu[8]-calcitonine M.

The starting material is accessible thus:

400 mg. of

BOC-Cys-Gly-Asn-Leu-Ser(tBu)-Thr(tBu)-Cys-Leu-Leu-Gly-OH, 600 mg. of H - Thr(tBu) - Tyr(tBu) - Thr(tBu)-Gln-Asp (OtBu) - Phe - Asn - Cys(BOC) - Phe - His - Thr(tBu)-Phe - Pro - Gln - Thr(tBu) - Ala - Ile - Gly - Val - Gly-Ala-Pro-$NH_2$, 100 mg. of N-hydroxysuccinimide, 120 mg. of dicyclohexylcarbodiimide and 6 ml. of dimethylformamide are stirred for 3 hours at 45° C. The mixture is then poured into 300 ml. of ether and the precipitate is filtered off. The crude product is purified by counter-current distribution in the system methanol+buffer+chloroform+carbon tetrachloride 11:3:6:7; buffer as in Example 1; K=0.7.

The decapeptide used as starting material is manufactured as described in Kamber and Rittel, Helv. Chim. Acta *51* (1968), 2061 for the corresponding Met[8]-decapeptide: The starting material used is H-Leu-Gly-OMe which is reacted with Z-leucine - N - hydroxysuccinimide ester, the resulting Z-Leu-Leu-Gly-OMe is hydrogenated the H-Leu-Leu-Glu-OMe, HCl condensed with TRI-Cys(TRI)-OH as shown under 9) in Example 1 of Kamber and Rittel, Helv. Chim. Acta *51*, (1968), 2061 and the resulting tetrapeptide derivative is worked up as described under 10) to 18) in the above-mentioned Application.

EXAMPLE 4

H-Cys-Gly-Asn-Leu-Ser-Thr-Cys-Nva-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ (Nva[8]-calcitonine M)

5 mg. of

BOC-Cys-Gly-Asn-Leu-Ser(tBu)-Thr(tBu)-Cys-Nva-Leu-Gly-Thr(tBu)-Tyr(tBu)-Thr(tBu)-Gln-Asp(OtBu)-Phe-Asn-Lys(BOC)-Phe-His-Thr(tBu)-Phe-Pro-Gln-Thr(tBu)-Ala-Ile-Gly-Val-Gly-Ala-Pro-$NH_2$ are mixed with 0.2 ml. of 95% trifluoracetic acid and kept for 1 hour at 30° C. Then 5 ml. of ether are added, the precipitate is removed on a centrifuge, washed with a small quantity of ether and dried. The dotriacontapeptide amide obtained in form of the trifluoracetate can be converted into the acetate by ion exchange.

The starting material can be prepared thus:

(1) Z-Nva-Leu-Gly-OMe 4.3 Grams of Z-L-Nva-2,4,5-trichlorophenyl ester (J. chem. Soc. (c) *1968*, 715) and 2.2 g. of H-Leu-Gly-OMe are mixed with 15 ml. of dimethylformamide and the reaction mixture is stirred for 48 hours at 35° C., then diluted with much chloroform, cooled in ice and agitated three times with 5% ice-cold potassium carbonate solution and three times with ice water. The chloroform solution is dried with sodium sulphate and then evaporated to dryness, finally under 0.1 mm. Hg to remove any residues of dimethylformamide. The residue is dissolved in chloroform and chromatographed on a column, prepared in chloroform, of silica gel, using for the elution a linear graduated chloroform-chloroform+methanol(1:1) (1 litre each). Fractions of 100 ml. each are collected, evaporated to dryness and the purity of the residue is inspected by thin-layer chromatography on silica gel plates and the pure fractions are combined. In toluene+acetone (1:1) the product reveals an R*f* value of 0.4.

(2) H-Nva-Leu-Gly-OMe

A solution of 1.7 g. of the above tripeptide in methanol is hydrogenated while being vigorously stirred in the presence of 400 mg. of palladium carbon (10% Pd). When hydrogen is no longer being absorbed, the catalyst is filtered off and the filtrate evaporated to dryness. The resulting colourless resin can be used for the further reaction as it is obtained.

(3) TRI-Cys-(TRI)-Nva-Leu-Gly-OMe 2.5 Grams of TRI-Cys(TRI)-OH and 1.1 g. of the above H-Nva-Leu-Gly-OMe are mixed with 40 ml. of acetonitrile and then 1.3 g. of dicyclohexylcarbodiimide are stirred in. The whole is stirred for 20 hours at 27° C., then the precipitate formed is suctioned off and extracted with 1 litre of chloroform. The eluate is evaporated to dryness and the residue triturated with petroleum ether. The petroleum ether solution is decanted and the insoluble product is dried and purified by 3 precipitations from petroleum ether. The tetrapeptide derivative is obtained as an amorphous, solid powder which reveals in thin-layer chromatography on silica gel plates in chloroform+methanol (98:2) an R*f* value of 0.62.

(4) H-Cys(TRI)-Nva-Leu-Gly-OMe 980 mg. of TRI-Cys(TRI)-Nva-Leu-Gly-OMe are dissolved at 30° C. in 25 ml. of 75% acetic acid and then kept for 1 hour, then evaporated to dryness and the residue is repeatedly triturated with ether. The ether-insoluble acetate of H-Cys(TRI)-Nva-Leu-Gly-OMe is dried at 35° C. under vacuum and further worked up as it is.

(5) DPC-Ser(tBu)-Thr(tBu)-Cys-(TRI)-Nva-Leu-Gly-OMe

A solution of 750 mg. of DPC-Ser(tBu)-Thr(tBu)-$NHNH_2$ in 6 ml. of dimethylformamide is cooled to −20° C. and 3.5 ml. of N-hydrogen chloride in ethyl acetate are added. Then 0.16 ml. of tertiary butylnitrite is added and the reaction mixture is kept for 15 minutes at −10° C.; then a solution, cooled at −10° C., of 500 mg. of H-Cys(TRI)-Nva-Leu-Gly-OMe in 4 ml. of dimethylformamide and 0.7 ml. of triethylamine are added and the batch is kept for 30 minutes at −10° C. and then for 18 hours at 0° C., then evaporated under a high vacuum at 40° C. bath temperature to a volume of about 5 ml., and the product is precipitated with ice water. It is thoroughly triturated, then suctioned off, washed with ice water and the crude hexapeptide derivative is dried in a desiccator over calcium chloride, and purified by three reprecipitations from ethyl acetate+cyclohexane. In the thin-layer chromatography on silica gel plates in toluene+acetone (7:3) the product reveals an R*f* value of 0.47.

(6) H-Ser(tBu)-Thr(tBu)-Cys(TRI)-Nva-Leu-Gly-OH

A solution of 430 mg. of DPC-Ser(tBu)-Thr(tBu)-Cys(TRI)-Nva-Leu-Gly-OMe in 10 ml. of 80% acetic acid is kept for 7 hours at 28° C., then evaporated to dryness in a rotary evaporator at 35° C. bath temperature, dried for 3 hours at 35° C. under 0.01 mm. Hg pressure, then dissolved in 30 ml. of methanol, mixed with 3 ml. of N-sodium hydroxide solution, stirred for 1 hour at 28° C., 2 ml. of glacial acetic acid are added and the whole is evaporated to dryness in a rotary evaporator at 35° C. bath temperature. The residue is triturated with ice water while adjusting the pH value to 6–7, suctioned off, rinsed with ice water and dried over calcium chloride in desiccator.

(7) BOC-Cys-(TRI)-Gly-Asn-Leu-Ser(tBu)-Thr(tBu)-Cys(TRI)-Nva-Leu-Gly-OH

A mixture of 270 mg. of BOC-Cys(TRI)-Gly-Asn-Leu-NH-$NH_2$ and 4 ml. of dimethylformamide is cooled to −20° C. and 1.2 ml. of N-hydrogen chloride in ethyl acetate are added. Then 0.044 ml. of tertiary butylnitrite is added and the whole is kept for 15 minutes at −10° C. Then a solution, cooled at −10° C., of 230 mg. of H-Ser(tBu)-Thr(tBu)-Cys(TRI)-Nva-Leu-Gly-OH in 4 ml. of dimethylformamide, 1 ml. of water and 0.25 ml. of triethylamine is added. The batch is kept for 18 hours at 0° C., then evaporated to a small volume under 0.01 mm. Hg at 35° C. bath temperature, and the decapeptide is precipitated with water. The precipitate is triturated, suctioned off and dried over calcium chloride in a desiccator. The powder is suspended in 7 ml. of methanol at 0° C., thoroughly triturated and then suctioned off.

(8) BOC-Cys-Gly-Asn-Leu-Ser(tBu)-Thr(tBu)-Cys-Nva-Leu-Gly-OH 105 mg. of the decapeptide obtained under (7) are dissolved in 20 ml. of dimethylformamide and within 1 hour this solution is vigorously dropped in a solution of 150 mg. of iodine in 100 ml. of methanol. The batch is stirred for 1 hour longer, then decolorized at 0° C. by adding N-sodium thiosulphate solution, then concentrated to a volume of about 20 ml. in a rotary evaporator and precipitated with 300 ml. of ether. The product is suctioned off, dried at 30° C. under vacuum and the powder is then triturated with water, suctioned off and dried over calcium chloride in a desiccator.

(9) Z-Asp(OtBu)-Phe-$OCH_3$ 30.3 Grams of Z-Asp(OtBu)-ONP and 18.3 g. of H-Phe-$OCH_3$.HCl are together dissolved in 150 ml. of dimethylformamide, and 11.8 ml. of triethylamine are dropped into the clear solution. The resulting suspension is stirred for 20 hours at room temperature, during which it turns deep yellow, then it is concentrated to about 100 ml. under vacuum and in 1 litre of ethyl acetate +chloroform (4:1) agitated three times with 5% citric acid, 19 times with about 2 N-sodium carbonate solution and with saturated sodium chloride solution until a neutral reaction has been reached. The crude product forms a yellow oil which is treated with active carbon in ether and, after having been seeded, crystallizes from 650 ml. of ether+hexane (1:1) in a refrigerator. It forms colourless needles melting at 74.5 to 76.5° C. In the thin-layer chromatogram on silica gel in the system chloroform +methanol (95:5) R$f$=0.74, in the system chloroform +acetone (75:25) R$f$=0.65.

(10) H-Asp(tBu)-Phe-$OCH_3$ 48.6 Grams of Z-Asp(OtBu)-Phe-$OCH_3$ in 700 ml. of methanol are mixed with 33.5 ml. of 3 N-hydrogen chloride in dioxan and 5 g. of 10% palladium carbon catalyst are decarbobenzoxylated at room temperature in a duck-shaped vessel. On cessation of the absorption of hydrogen the whole is filtered and the filtrate evaporated, to yield 38.7 g. of a white foam. In the thin-layer chromatogram on silica gel in chloroform+methanol (9:1) R$f$=0.60, in chloroform+acetone (1:1) R$f$=0.58, $Rf_{102E}$=0.42.

The product is used as it is obtained in the following condensation.

(11) Z-Gln-Asp(OtBu)-Phe-$OCH_3$

A clear, pale-yellowish solution is prepared of 38.6 g. of the resulting H-Asp(OtBu)-Phe-$OCH_3$.CHl and 42.0 g. of Z-Gln-ONP in 170 ml. of dimethylformamide, and 13.9 ml. of triethylamine are slowly stirred in. The resulting orange suspension is stirred for 24 hours at 30–35° C. bath temperature. During this time another 40 ml. of dimethylformamide are added as well as 1.39 ml. of triethylamine.

For working up the batch it is dissolved in 4 litres of chloroform and washed in a 20-stage counter-current distribution apparatus (phase volume: bottom phase 400 ml., upper phase 200 ml. per vessel) successively with 1 litre of 5% citric acid solution, 400 ml. of saturated sodium chloride solution, 6 litres of about 2 N-sodium carbonate solution and 2.8 litres of saturated sodium chloride solution. After drying and evaporating the tripeptide derivative crystallizes from 1.8 litres of ethanol in a refrigerator slowly, to yield Z-Gln-Asp(OtBu)-Phe-$OCH_3$ melting at 186–188° C.

In thin-layer chromatogram silica gel the following R$f$ values are obtained:

In chlorofom+methanol (9:1) R$f$=0.39; in chloroform+acetone (1:1) R$f$=0.24; $Rf_{102E}$=0.69, $Rf_{89}$=0.46, $Rf_{43A}$=0.65, $[\alpha]_D^{20}$=−28°±1° (c.=1.3% in dimethylformamide).

(12) H-Gln-Asp(OtBu)-Phe-$OCH_3$

A solution of 7.55 g. of Z-Gln-Asp(OtBu)-Phe-$OCH_3$ in 400 ml of methanol is mixed with 4.1 ml. of 3 N-hydrogen chloride in dioxan and hydrogenated in the presence of 2 g. of palladium carbon (10% Pd), then the catalyst is suctioned off and the filtrate evaporated to yield H-Gln-Asp(OtBu)-Phe-$OCH_3$.HCL in form of a colourless foam. In the thin-layer chromatogram on silicagel the following R$f$ values are obtained: In chloroform+mefollowing Rf values are obtained: In chloroform+methanol (9:1) R$f$=0.13; in chloroform+acetone (25:75) R$f$=0.14; $Rf_{102E}$=0.22.

(13) Z-Thr(tBu)-Gln-Asp(OtBu)-Phe-$OCH_3$

The whole quantity of the hydrochloride of (12) together with 7.4 g. of Z-Thr(tBu)-OSU is dissolved at room temperature in 14 ml. of dimethylformamide, and 1.72 ml. of triethylamine are dropped in while cooling in an ice bath. The brownish suspension is then stirred for 20 hours at room temperature, worked up in the usual manner in much ethyl acetate (washing 3 times each with 5% citric acid and about 2 N-sodium carbonate solution, washing neutral with saturated sodium chloride solution, drying over sodium sulphate and evaporation at 30–40° C. under vacuum) the crude product is treated with active carbon in ethanol and recrystallized in a refrigerator from 90 ml. of ethanol; it melts at 155–161° C.

In the thin-layer chromatogram on silica gel the following R$f$ values are found: In chloroform+methanol (9:1) R$f$=0.52; in cyclohexane+acetone (3:7) R$f$=0.48; $Rf_{89}$=0.48; $Rf_{121A}$=0.76. $[\alpha]_D^{20}$=−4°±0.5° (c.=2.3% in dimethylformamide).

(14) H-Thr(tBu)-Gln-Asp(OtBu)-Phe-$OCH_3$ 478 mg. of Z-Thr(tBu)-Gln-Asp(OtBu)-Phe-$OCH_3$ in 150 ml. of methanol are hydrogenated neutral at room temperature with 100 mg. of palladium carbon (10% Pd), to yield 395 mg. of a colourless foam of H-Thr(tBu)-Gln-Asp(OtBu)-Phe-$OCH_3$ which is used in the following condensation without previous purification.

In the thin-layer chromatogram on silica gel the following R$f$ values are found: In chloroform+methanol (1:1) R$f$=0.75; in chloroform+methanol (9:1) R$f$=0.17; in acetone R$f$=0.18; $Rf_{102E}$=0.23; $Rf_{89}$=0.12.

(15) Z-Tyr(tBu)-Thr(tBu)-Gln-Asp(OtBu)-Phe-$OCH_3$ 687 mg. of Z-Tyr(tBu)-OH-dicyclohexylammonium salt in chloroform are agitated with aqueous citric acid and the resulting free acid (a clear oil) in 6.5 ml. of tetrahydrofuran is mixed with 0.139 ml. of N-methylporpholine. At −22° C. 0.170 ml. of chloroformic acid isobutyl ester is added and the whole is stirred for half an hour at −22 to −10° C. Then a precooled solution of the above-described H-Thr(tBu)-Gln-Asp(OtBu)-Phe-$OCH_3$ in 15 ml. of tetrahydrofuran is dropped in, rinsing being performed with 5 ml. of the same solvent. After half an hour at −10° C. the batch is stirred on for 15 hours at room temperature, then concentrated under vacuum and worked up in the usual manner in ethyl acetate (see under (13)). The crude product is dissolved in 15 ml. of ethyl acetate, precipitated with 40 ml. of ether and then crystallized from methanol in a refrigerator; it forms short, thick needles which on drying under a high vacuum at 50° C. effloresce. Melting point: 169–1730° C.

In the thin-layer chromatogram on silica gel the following R$f$ values are found: In chloroform+methanol (9:1) R$f$=0.46; in chloroform+methanol (1:1) R$f$=0.95; in chloroform + acetone (1:1) R$f$ = 0.44; $Rf_{89}$ = 0.61; $Rf_{acetone}$=0.68; $Rf_{102E}$=0.73. $[\alpha]_D^{21}$=−54°±0.5° (c.=2.0% in dimethylformamide).

(16) H-Tyr(tBu)-Thr(tBu)-Gln-Asp(OtBu)-Phe-$OCH_3$ 2.36 Grams of Z-Tyr(tBu)-Thr(tBu)-Gln-Asp(OtBu)-Phe-$OCH_3$ in 450 ml. of methanol are hydrogenated in the usual manner with 500 mg. of palladium carbon (10% Pd) at room temperature, to form a colourless foam which is unitary according to its thin-layer chromatogram and is further used as it is obtained.

In the thin-layer chromatogram on silica gel the following R$f$ values are found: In chloroform+methanol (95:5) R$f$=0.22; $Rf_{89}$=0.42.

(17) Z-Thr(tBu)-Tyr(tBu)Thr(tBu)-Gln-Asp(OtBu)-Phe-$OCH_3$

The product of (16) together with 1.48 g. of Z-Thr(tBu)-OSU is dissolved in 3 ml. of dimethylformamide and stirred for 21 hours at room temperature. The reaction solution is diluted with much ethyl acetate and worked up as usual (see under (13)). The crude product is dissolved with heating in 30 ml. of ethyl acetate+methanol (9:1), then cooled in an ice bath and precipitated with 80 ml. of ether. The resulting product is a colourless, amorphous powder melting at 146–148° C.

In the thin-layer chromatogram on silica gel the following R*f* values are obtained: In chloroform+methanl (9:1) R*f*=0.55; in chloroform+acetone (1:1) R*f*=0.60; $Rf_{89}$= 0.43. $[\alpha]_D^{21}=+6\pm0.5°$ (c.=2.0 in dimethylformamide).

(18) Z-Thr(tBu)-Tyr(tBu)-Thr(tBu)-Gln-Asp(OtBu)-Phe-NH-$NH_2$

A solution of 1.91 g. of Z-Thr(tBu)-Tyr(tBu)-Thr(tBu)-Gln-Asp(OtBu)-Phe-$OCH_3$ in 80 ml. of methanol is mixed with 8 ml. of hydrazine hydrate, then kept for 22 hours at room temperature and the product which has settled out is filtered off and dried under a high vacuum at 60° C., to yield the microcrystalline hydrazide melting at 226–229° C. with decomposition.

In the thin-layer chromatogram on silica gel the following R*f* values are found: In chloroform+methanol (9:1) R*f*=0.32; in cyclohexane+acetone (3:7) R*f*=0.23; $Rf_{89}$=0.34. $[\alpha]_D^{20}=+4°\pm1°$ (c.=1.0 in dimethylformamide).

(19) Z-Lys(BOC)-Phe-OMe 6.9 ml. of triethylamine are stirred at room temperature into 25.0 g. of Z-Lys(BOC)-ONP and 10.7 g. of H-Phe-OMe, HCL in 70 ml. of dimethylformamide and the mixture is stirred on for 18 hours, then diluted with ethyl acetate and washed with potassium carbonate solution until it is free from nitrophenol, agitated with 0.1 molar citric acid and water, dried over sodium sulphate and evaporated to dryness under vacuum. From ethyl acetate+hexane the protected, crystalline dipeptide melting at 78–80° C. is obtained.

In the thin-layer chromatogram on silica gel in the system chloroform+acetone (8:2) R*f*=0.45.

(20) Z-Lys(BOC)-Phe-NH-$NH_2$

A solution of 27 g. of the above dipeptide methyl ester in 135 ml. of warm methanol is mixed at room temperature with 25 ml. of hydrazine hydrate and left to itself for 16 hours. The crystallizate is mixed with 135 ml. of water, suctioned off and thoroughly washed with water; after recrystallization from aqueous methanol it melts at 173–174° C. In the thin-layer chromatogram on silica gel in the system chloroform+methanol (95:5) R*f*=0

(21) Z-Lys(BOC)-Phe-His-OMe 5.4 Grams of Z-Lys(BOC)-Phe-NH-$NH_2$ in 40 ml. of dimethylformamide are mixed at −16° C. with 6.8 ml. of 3.66 N-hydrochloric acid in dioxan and then with 1.5 ml. of tertiary butylnitrite. After 10 minutes at −10° C. to −15° C. 3.5 ml. of triethylamine are added. Then 3.64 g. of solid H-His-OMe, 2HCl are added and then 4.2 ml. of triethylamine are dropped in. The batch is allowed to warm up to 0° C. within 1 hour, during which a pH value of about 7 is adjusted by adding a total of 0.8 ml. of triethylamine. The whole is stirred overnight at 0° C., then poured into 250 ml. of water and the smeary product is obtained in pulverulent form by trituration with water. In the thin-layer chromatogram on silica gel in chloroform+methanol (9:1) R*f*=0.4.

(22) H-Lys(BOC)-Phe-His-OMe 6.8 Grams of Z-Lys(BOC)-Phe-His-OMe in 140 ml. of methanol are hydrogenated in the presence of 1 g. of 10% palladium carbon. On completion of the hydrogenation the catalyst is filtered off, the filtrate evaporated to dryness and the residue immediately further worked up.

(23) Z-Asn-Lys(BOC)-Phe-His-OMe 5.4 Grams of H-Lys(BOC)-Phe-His-OMe and 4.5 g. of Z-Asn-ONP in 20 ml. of dimethylformamide are stirred for 20 hours at room temperature. The peptide derivative is then precipitated with ethyl acetate, filtered off, washed with ether and recrystallized from methanol whereupon the product melts at 182 to 183° C. In the thin-layer chromatogram on silica gel $Rf_{100}$=0.57. $[\alpha]_D^{20}=-28°$ (c.=1 in dimethylformamide).

(24) Z-Asn-Lys(BOC)-Phe-His-NH-$NH_2$ 3.97 Grams of Z-Asn-Lys(BOC)-Phe-His-OMe are dissolved in 8 ml. of warm dimethylformamide and 12 ml. of methanol. While this solution still has a temperature of about 30° C., it is mixed with 2.5 ml. of hydrazine hydrate and kept for 20 hours at room temperature. The peptide hydrazide is precipitated with water, then filtered off, washed free from hydrazine with water and recrystallized from ethanol; it melts at 200–201° C. In the thin-layer chromatogram on silica gel $Rf_{43C}$=0.5.

(25) H-Phe-Pro-OH

Z-Phe-Pro-OH is converted into the free dipeptide by catalytic reduction with palladium carbon in methanol+water (4:1). The dipeptide is isolated by concentrating the hydrogenating solution to a small volume, after having filtered off the catalyst, and addition of acetone, in fact as the crystalline dipeptide monohydrate melting at 125–128° C.

(26) Z-Thr(tBu)-Phe-Pro-OH 20.2 Grams of Z-Thr(tBu)-OSU, 13.3 g. of H-Phe-Pro-OH (monohydrate) and 6.54 ml. of triethylamine are dissolved in 80 ml. of dimethylformamide, kept overnight at about 20° C. and then concentrated under a high vacuum until a sticky substance has formed which is dissolved in 500 ml. of ethyl acetate and washed with 5×100 ml. of 5% tartaric acid solution and then with water until the washings run neutral. The organic phase is evaporated to dryness and the residual, solid foam is powdered and dried under a high vacuum at 40° C. Two more precipitations from ethyl acetate+petroleum ether furnish 13.3 g. of amorphous, chromatographically pure tripeptide derivative having an unsharp melting range of about 75 to 85° C. In the thin-layer chromatogram on silica gel $Rf_{115}$=0.68; $Rf_{121A}$=0.57.

(27) Z-Ile-Gly-OMe

A suspension of 2.23 g. of Z-Ile-OH-dicyclohexylammonium salt in ethyl acetate is acidified with 0.2 molar citric acid. The resulting ethyl acetate solution is washed neutral, dried and evaporated to dryness. The residue is dissolved in 15 ml. of acetonitrile, and the solution is mixed with 750 mg. of H-Gly-OMe, HCl and, while stirring at 0° C., with 0.84 ml. of triethylamine are added. After 10 minutes 1.24 g. of dicyclohexyl carbodiimide are added and the whole is stirred overnight at 0° C. The precipitate is filtered off and the filtrate evaporated to dryness, and the residue is taken up in 30 ml. of ethyl acetate and filtered. The ethyl acetate solution is washed with 0.2 molar citric acid solution and saturated sodium bicarbonate solution, dried and concentrated to about 10 ml. under vacuum. On addition of 25 ml. of hexane the protected dipeptide, melting at 120–122° C., crystallizes out. R*f*=0.53 in the system chloroform+methanol (95:5) in thin-layer chromatography on silica gel.

(28) H-Ile-Gly-OMe

A solution of 3.36 g. of Z-Ile-Gly-OMe in 100 ml. of methanol and 10 ml. of N-hydrochloric acid is hydrogenated in the presence of 0.5 g. of 10% palladium carbon. The catalyst is filtered off and the solvent completely evaporated. The resulting foam is unitary in the thin-layer chromatogram on silica gel; R*f*=0.26 in chloroform+methanol (95:5).

(29) Z-Ala-Ile-Gly-OMe

While stirring 2.39 g. of the above dipeptide ester hydrochloride and 3.78 g. of Z-Ala-ONP in 40 ml. of dimethylformamide, 1.4 ml. of triethylamine are added and the resulting suspension is stirred overnight at room temperature, diluted with ethyl acetate and washed free from nitrophenol with dilute potassium carbonate solution, and then further washed with 0.1 molar citric acid and water. During the agitation part of the tripeptide derivative remains undissolved and is filtered off. The ethyl acetate solution is dried and evaporated to dryness. The residue likewise consists of pure product melting at 190–191° C. In the thin-layer chromatogram on silica gel in the system chloroform+methanol (95:5) $Rf=0.5$.

(30) H-Ala-Ile-Gly-OMe 2.0 Grams of Z-Ala-Ile-Gly-OMe are dissolved with gentle heating in 40 ml. of methanol and then hydrogenated in the presence of 300 mg. of palladium carbon (10% Pd). On completion of the hydrogenation the catalyst is filtered off and the filtrate evaporated completely to dryness. The residue is found to be unitary in the thin-layer chromatogram and is immediately further worked up.

(31) Z-Thr(tBu)-Ala-Ile-Gly-OMe 1.36 Grams of H-Ala-Ile-Gly-OMe and 2.5 g. of Z-Thr(tBu)-OSU in 3 ml. of dimethylformamide are stirred for 20 hours at room temperature. The tetrapeptide derivative is precipitated with ether, filtered off and washed with ether; after recrystallization from ethanol it melts at 229–230° C. $[\alpha]_D^{20}=-43°$ (c.=1 in methanol. $Rf=0.55$ in the system chloroform+methanol (95:5) on silica gel.

(32) H-Thr(tBu)-Ala-Ile-Gly-OMe

A solution of 5.66 g. of the above carbobenzoxy compound in 400 ml. of warm methanol is hydrogenated in the presence of 1 g. of palladium carbon (10% Pd). The catalyst is filtered off and the methanol expelled under vacuum at 40° C. The solid residue is immediately further worked up. $Rf=0.2$ in the system chloroform+methanol (95:5) on silica gel.

(33) Z-Gln-Thr(tBu)-Ala-Ile-Gly-OMe 4.6 Grams of the H-Thr(tBu)-Ala-Ile-Gly-OMe described under (32) in 30 ml. of dimethylformamide are mixed with 3.5 g. of Z-Gln-ONP and stirred at room temperature until the mixture has turned solid. It is then kept overnight and diluted with ether, the precipitate is filtered off and washed with ether until it is free from nitrophenol. The protected pentapeptide reveals in the thin-layer chromatogram on silica gel an $Rf$ value of 0.14 in the system chloroform+methanol (95:5). It melts above 250° C.

(34) H-Gln-Thr(tBu)-Ala-Ile-Gly-OMe,HCl 14.4 Grams of the pentapeptide derivative described under (33) are suspended in 800 ml. of 80% methanol and heated for some time at 50° C. The suspension is cooled to room temperature, mixed with 20.8 ml. of hydrochloric acid and 3 g. of palladium carbon (10% Pd) and hydrogenated until the absorption of hydrogen ceases and the starting material has dissolved. The catalyst is filtered off and the filtrate evaporated at 40° C. under vacuum, and the residue is dehydrated by being twice evaporated under a high vacuum with dimethylformamide. The residue is used as it is obtained. $Rf_{100}=0.33$ in the thin-layer chromatogram on silicagel.

(35) Z-Thr(tBu)-Phe-Pro-Gln-Thr(tBu)-Ala-Ile-Gly-OMe 12.0 Grams of the pentapeptide-methyl ester hydrochloride described under (34) are dissolved in 80 ml. of dimethylformamide and 13.3 g. of Z-Thr(tBu)-Phe-Pro-OH and then 5.75 g. of N-hydroxysuccinimide are stirred in at room temperature, and then at 0° C. 2.76 ml. of triethylamine and 6.2 g. of dicyclohexylcarbodiimide. The whole is stirred at 0° C. until it turns thick and then kept overnight at 0° C., concentrated to about 50 ml. under a high vacuum and the product is precipitated with 300 ml. of ether. The isolated material is washed with 0.05-molar citric acid and water and dried under a high vacuum at 40° C. and purified by recrystallization from about 1 litre of isopropanol, to yield 18.2 g. of the protected octapeptide derivative. $Rf_{89}=0.27$ in the thin-layer chromatogram on silica gel.

(36) Z-Thr(tBu)-Phe-Pro-Gln-Thr(tBu)-Ala-Ile-Gly-OH 10.9 Grams of the octapeptide methyl ester described under (35) are dissolved with heating at 70° C. in 190 ml. of 90% methanol; the solution is cooled to room temperature and 30 ml. of N-sodium hydroxide solution and, 10 minutes later, 160 ml. of water are added in small portions. The whole is then filtered clear and from the filtrate the product is precipitated by pouring in 600 ml. of 0.05 N-ice-cold hydrochloric acid. The precipitate is filtered off and washed neutral with water. The product is unitary in the thin-layer chromatogram on silica gel methanol.

($Rf_{100}=0.45$) and can be recrystallized from aqueous methanol.

(37) H-Thr(tBu)-Phe-Pro-Gln-Thr(tBu)-Ala-Ile-Gly-OH

A solution of 3.6 g. of the Z-Thr(tBu)-Phe-Pro-Gln-Thr(tBu)-Ala-Ile-Gly-OH obtained in (36) in 100 ml. of acetic acid of 80% strength is hydrogenated in the presence of 0.5 g. of palladized carbon (10% Pd). On cessation of the hydrogen absorption the catalyst is suctioned off and the solution evaporated to dryness. The acetate of the octapeptide derivative, obtained in the form of a granular snow, is dried under a high vacuum. $Rf_{100}=0.21$ in the thin-layer chromatogram on silica gel.

(38) Z-Asn-Lys(BOC)-Phe-His-Thr(tBu)-Phe-Pro-Gln-Thr(tBu)-Ala-Ile-Gly-OH

A solution of 11.25 g. of Z-Asn-Lys(BOC)-Phe-His hydrazide in 65 ml. of dimethylformamide is mixed within 2 minutes at −20° to −25° C. with 8.4 ml. of 4.2 N-hydrogen chloride in dioxane. Then 2.1 ml. of tertiary butylnitrite are added at −15 to −20° C. and the whole is kept for 15 minutes at −15° C., cooled to −20° C. and 4.8 ml. of triethylamine are added and then a solution of 9.0 g. of the product described in (37) in 210 ml. of dimethylformamide of 90% strength, while maintaining the internal temperature at −15° C. by vigorous cooling. Within 1 hour the batch is warmed to 0° C., while maintaining the pH value at 7 to 8 by occasional addition of triethylamine (total of triethylamine added: 3.5 ml.). The batch is stirred overnight at 0° C., then poured into 3 litres of ether, the floccular precipitate is filtered off and washed twice with ether and once with water. The crude product is dissolved in 500 ml. of warm methanol and reprecipitated by being poured into 1.5 litres of 1% acetic acid. The product is filtered off, twice washed with water, and once more precipitated as described. $Rf_{100}=0.33$ (on silica gel plates).

(39) H-Asn-Lys(BOC)-Phe-His-Thr(tBu)-Phe-Pro-Gln-Thr(tBu)-Ala-Ile-Gly-OH

A solution of 1.7 g. of the above protected dodecapeptide in 100 ml. of 80% acetic acid is hydrogenated in the usual manner in the presence of 0.5 g. of palladized carbon (10% Pd). The catalyst is filtered off and the filtrate considerably concentrated in a high vacuum at 30° C., and the residue is lyophilized with tertiary butanol. The product is obtained in a quantitative yield; it is unitary in the thin-layer chromatogram ($Rf_{100}$=0.1 on silica gel) and is immediately further worked up.

(40) Z-Thr(tBu)-Tyr(tBu)-Thr(tBu) - Gln-Asp(OtBu)-Phe-Asn-Lys(BOC)-Phe - His-Thr(tBu)-phe-Pro-Gln-Thr(tBu)-Ala-Ile-Gly-OH A solution of 1.73 g. of the peptide derivative described under (18) in 10 ml. of dimethylformamide is prepared at 50° C., then cooled to −20° C. and 0.9 ml. of 4.2 N-hydrogen chloride in dioxan is dropped in. At −15° C., 0.22 ml. of tertiary butylnitrite is then added and the whole is allowed to react for 15 minutes at −15° C., then once more cooled to −20° C., and 0.53 ml. of triethylamine and then a solution of 1.6 g. of the peptide derivative described under (39) in 40 ml. of 90% dimethylformamide are dropped in. The temperature is raised to 0° C. within 1 hour, while maintaining a pH value from 7 to 8 by portionwise addition of triethylamine. In all, 0.25 ml. of triethylamine is added. After stirring for another 15 hours at 0° C. the product is precipitated by pouring the batch into ether; the precipitate is filtered off, washed with ether and water and purified by one precipitation from dimethylformamide+ethyl acetate and one precipitation from dimethylformamide+0.02 N-hydrochloric acid. The pure material reveals in the thin-layer chromatogram on silica gel an $Rf_{100}$ value of 0.40.

(41) Z-Ala-Pro-$NH_2$ 2.28 Grams of H-Pro-$NH_2$ and 7.57 g. Z-Ala-ONP are dissolved in 20 ml. of dimethylformamide and the yellow solution is kept for 18 hours at room temperature, then evaporated to dryness under a high vacuum. The residue is mixed with ether and the resulting powder is thoroughly triturated, suctioned off and dried, to yield 5.5 g. of Z-Ala-Pro-$NH_2$ melting at 167.5 to 168.5° C. $[\alpha]_D^{20}$=74° (c.=1 in methanol).

(42) Z-Gly-Ala-Pro-$NH_2$

A solution of 27.1 g. of the above dipeptide derivative in 425 ml. of ethanol is mixed with 85 ml. of N-aqueous hydrochloric acid and hydrogenated in the presence of 4.25 g. of palladium carbon (10% Pd). On completion of the hydrogenation the solution is evaporated at 40–50° C. bath temperature under vacuum. The residue is dissolved at 40° C. in 40 ml. of dimethylformamide; the solution is cooled to 20° C., then 29.1 g. of Z-Gly-ONP are added and after dissolution 11.2 ml. of absolute triethylamine are stirred in dropwise within 45 minutes. The batch is then stirred for 20 hours at room temperature. The suspension is evaporated at 40° C. under 0.01 mm. Hg pressure and the residue distributed between 600 ml. of water and 300 ml. of ether. The aqueous layer is extracted with 2× 300 ml. of ether and the ethereal layer with 2× 300 ml. of water. The aqueous fractions are combined and evaporated at 40–50° C. under vacuum and repeatedly dehydrated by adding chloroform and evaporating. The well-dried residue is taken up in 500 ml. of ethyl acetate at 40 to 50° C.; the insoluble triethylamine hydrochloride is filtered off and the filtrate mixed with 10 ml. of ether at 30 to 40° C., whereupon crystallization sets in. After standing for about 20 hours at +5° to +10° C. the crystals are isolated, washed and dried; they melt at 105–106° C. The product contains 3% of triethylamine hydrochloride; it can be further reacted in this form.

For purification 5.0 g. of the above crude crystallizate are dissolved in 10 ml. of water, mixed with 20 ml. of methylenechloride and then with 15 ml. of saturated potassium carbonate solution. The organic layer is separated, extracted with 10 ml. of saturated potassium carbonate solution and the aqueous layer is extracted with 15 ml. of methylenechloride. The methylenechloride solutions are combined, dried with anhydrous sodium sulphate and evaporated. The residue is crystallized from 50 ml. of ethyl acetate, to yield 4.4 g. of tripeptide derivative melting at 109 to 112° C. Crystallization from acetone+methanol+ether (10:4:6) furnishes crystals melting at 144.5 to 145.5° C. (crystal polymorphy). $[\alpha]_D^{20}$=−93° (c.=1.0 in methanol).

In the thin-layer chromatogram on silica gel in the system chloroform+methanol (8:2) Rf=0.38.

(43) H-Gly-Ala-Pro-$NH_2$

A solution of 18.8 g. of the crude tripeptide amide derivative obtained in (42) in 400 ml. of dimethylformamide is hydrogenated in the presence of 1.0 g. of palladium carbon (10% Pd). On termination of the hydrogenation the batch is filtered and the solution degassed for a short time and then used in the next step.

(44) Z-Val-Gly-Ala-Pro-$NH_2$

The solution obtained in (43) of the tripeptide amide (550 ml.) is mixed with 20.1 g. of Z-Val-p-nitrophenyl ester and the mixture is kept for 18 hours at room temperature, then evaporated to dryness at 50–60° C. under 0.01 mm. Hg pressure; the residue is triturated with 300 ml. of ether and filtered. The filter residue is dried and in 210 ml. of absolute ethanol stirred for 15 minutes at 70–80° C., cooled to 0° C. and filtered. The residue is crystallized from a mixture of 170 ml. of absolute tetrahydrofuran, 25 ml. of water and 110 ml. of ether; the product melts at 209–211° C. Rf=0.42 on silica gel plates in chloroform+methanol (8:2).

(45) H-Val-Gly-Ala-Pro-$NH_2$

A solution of 1.1 g. of Z-Val-Gly-Ala-Pro-$NH_2$ in 50 ml. of 80% methanol is hydrogenated in the presence of 0.3 g. of palladium carbon (10% Pd). On cessation of the absorption of hydrogen the catalyst is suctioned off, the solution evaporated and the residue dried under a high vacuum at 35° C. bath temperature, to yield the tetrapeptide H-Val-Gly-Ala-Pro-$NH_2$ as a colourless substance. Rf=0.20 (silica gel plates; chloroform+methanol 1:1).

(46) Z-Thr(tBu)-Tyr(tBu)-Thr(tBu)-Gln - Asp(OtBu)-Phe - Asn-Lys(BOC)-Phe-His-Thr(tBu)-Phe-Pro-Gln-Thr(tBu)-Ala-Ile-Gly-Val-Gly-Ala-Pro-$NH_2$

A solution of 800 mg. of the peptide derivative described under (40), 500 mg. of H-Val-Gly-Ala-Pro-$NH_2$ and 170 mg. of N-hydroxysuccinimide in 10 ml. of dimethylformamide is concentrated to about one half under a high vacuum and 250 mg. of dicyclohexylcarbodiimide are added. The whole is stirred overnight at room temperature, precipitated with ether and the product is isolated. It is purified by a Craig distribution in a mixture of methanol+buffer (as in Example 1)+chloroform+carbon tetrachloride (10:3:5:6), K=0.29. The pure product isolated from the distribution reveals an $Rf_{107}$=0.62 (on silica gel plates) in the thin-layer chromatogram.

(47) H-Thr(tBu) - Tyr(tBu)-Thr(tBu)-Gln-Asp(OtBu)-Phe - Asn - Lys(BOC) - Phe-His-Thr(tBu)-Phe-Pro-Gln-Thr(tBu) - Ala - Ile-Gly-Val-Gly-Ala-Pro-$NH_2$

A solution of 300 mg. of the above peptide derivative in 30 ml. of 80% acetic acid is hydrogenated in the presence of 100 mg. of palladium carbon (10% Pd). On completion of the decarbobenzoxylation the catalyst is filtered off, the filtrate considerably concentrated under a high vacuum at 30° C. and the residue lyophilized from tertiary butanol. The residue is dissolved in 10 ml. of methanol, rendered weakly alkaline by adding N-sodium bicarbonate solution and is precipitated by being dropped into 0.1N-sodium carbonate solution. The product is immediately reprecipitated in the same manner. In the thin-layer chromatogram on silica gel $Rf_{100}$=0.34.

(48)

BOC-Cys-Gly-Asn-Leu-Ser(tBu)-Thr(tBu)-Cys-Nva-Leu-Gly-Thr-(tBu)-Tyr(tBu)-Thr(tBu)-Gln-Asp(OtBu)-Phe-Asn-Lys(BOC)-Phe-His-Thr(tBu)-Phe-Pro-Gln-Thr(tBu)-Ala-Ile-Gly-Val-Gly-Ala-Pro-$NH_2$ 23 mg. of

BOC-Cys-Gly-Asn-Leu-Ser(tBu)-Thr(tBu)-Cys-Nva-Leu-Gly-OH, 35 mg. of H-Thr(tBu)-Tyr(tBu) - Thr(tBu) - Gln-Asp (OtBu)-Phe-Asn-Lys(BOC) - His - Phe-Thr(tBu)-Phe-Pro-Gln-Thr(tBu)-Ala-Ile - Gly-Val-Gly-Ala-Pro-$NH_2$, 7 mg. of N-hydroxysuccinimide, 8 mg. of dicyclohexlcarbodiimide and 0.5 ml. of dimethylformamide are stirred for 4 hours at 45° C. Then 15 ml. of ether are added and the fine precipitate formed is suctioned off. For purification the crude product is subjected to a multiplicative distribution over 35 steps in the solvent system methanol+buffer+chloroform+carbon tetrachloride (11:3:6:7); (buffer as in Example 1).

EXAMPLE 5

H-Cys-Gly-Asn-Leu-Ser-Thr-Cys-Abu-Leu-Gly-Thr-Tyr-Thr-Gln-Asp-Phe-Asn-Lys-Phe-His-Th᷊-Phe-Pro-Gln-Thr-Ala-Ile-Gly-Val-Gly-Ala-Pro-$NH_2$ $Abu^8$-cal-citonine M 1.8 g. of BOC-Cys-Gly-Asn-Leu-Ser(tBu)-Thr(tBu)-Cys-Abu-Leu-Gl᷊ Thr-(tBu)-Tyr(tBu)-Thr(tBu)-Gln-Asp(OtBu)-Phe-Asn-Lys(BOC)-Phe-His-Thr(tBu)-Phe-Pro-Gln-Thr(tBu)-Ala-Ile-Gly-Val-Gly-Ala-Pro-$NH_2$ in finely powdered form are added to 50 ml. of ice-cold concentrated hydrochloric acid; the mixture is stirred for 10 minutes at 0° C., then 300 ml. of ice-cold 10% acetic acid are added and the whole is filtered through a column of Merck ion exchange resin N°II in the acetate form. The solution is then mixed with n-octanol and evaporated in a rotary evaporator at 40° C. bath temperature; the evaporation residue is freed from n-octanol by being washed with petroleum ether, dried at 40° C., dissolved in water and lyophilized, to furnish the doctriacontapeptide amide as an almost colourless, light-weight powder.

The starting material is prepared thus:

2.0 g. of

BOC-Cys-Gly-Asn-Leu-Ser(tBu)-Thr(tBu)-Cys-Abu-Leu-Gly-OH, 3.2 g. of H-Thr(tBu) - Tyr(tBu)-Thr(tBu)-Gln - Asp (OtBu) - Phe-Asn-Lys(BOC)-Phe-His-Thr(tBu) - Phe-Pro-Gln - Thr(tBu) - Ala-Ile-Gly-Val-Gly-Ala-Pro-$NH_2$ and 500 mg. of N-hydroxysuccinimide are mixed with 35 ml. of dimethylformamide. Then a solution of 600 mg. of dicyclohexylcarbodiimide in 5 ml. of dimethylformamide is stirred in and stirring is continued for 4 hours at 45° C., then cooled to 0° C. and the reaction mixture is introduced into 600 ml. of ether, kept for 3 hours at 0° C., suctioned and the crude product is dried under vacuum at 35° C. For purification it is mixed with methanol, filtered off in a small quantity of dicyclohexylurea and chromatographed on a column (4.8×120 cm.) of Sephadex LH–20 prepared in methanol. Fractions of 20 ml. each are collected, evaporated to dryness and the purity of the fractions is evaluated by thin-layer chromatography on silica gel plates in systems 52A and 100. The pure fractions are combined.

The decapeptide derivative used as starting material can be prepared, for example, as follows:

Z-Abu-OH is condensed by the mixed anhydride method (mixed anhydride with pivaoylchloride) with H-Leu-Gly-OMe, the tripeptide derivative Z-Abu-Leu-Gly-OMe is purified by chromatography on silica gel and hydrogenated to H-Abu-Leu-Gly-OMe and the further working is as described for H-Met-Leu-Gly-OMe in Kamber and Rittel, Helv. Chim. Acta *51* (1968), 2061 in Example 1 under (9) to (18).

EXAMPLE 6

H-Cys-Gly-Asn-Leu-Ser-Thr-Cys-Met-Leu-Gly-Thr-Gly-Thr-Gln-Asp-Phe-Asn-Gly-Phe-His-Thr-Phe-Pro-Gln-Thr-Ala-Ile-Gly-Val-Gly-Ala-Pro-$NH_2$ ($Gly^{12, 18}$-calcitonine M)

500 mg. of

BOC-Cys-Gly-Asn-Leu-Ser(tBu)-Thr(tBu)-Cys-Met-Leu-Gly-Thr-(tBu)-Gly-Thr(tBu)-Gln-Asp(OtBu)-Phe-Asn-Gly-Phe-His-Thr-(tBu)-Phe-Pro-Gln-Thr(tBu)-Ala-Ile-Gly-Val-Gly-Ala-Pro-$NO_2$ are dissolved in 7 ml. of ice-cold 95% trifluoracetic acid; the solution is heated to 30° C. and then left to itself for 1 hour, then poured into 1 litre of ice-cold ether and the fine precipitate is suctioned off. For conversion into the acetate the trifluoracetate of dotriacontapeptide amide is dissolved in 10% acetic acid and filtered through a column of Merck ion exchange resin N°II in the acetate form. The eluate is lyophilized.

The starting material is obtained when a mixture of 620 mg. of the decapeptide derivative [described in Kamber and Rittel, Helv. Chim. Acta *51* (1968), 2061

BOC-Cys-Gly-Asn-Leu-Ser(tBu)-Thr(tBu)-Cys-Met-Leu-Gly 1130 mg. of H-Thr(tBu)-Gly-Thr(tBu)-Gln-Asp(Otbu)-Phe-Asn-Gly-Phe-His-Thr(tBu) - Phe-Pro-Gln-Thr(tBu)-Ala-Ile-Gly - Val - Gly-Ala-Pro-$NH_2$, 160 mg. of N-hydroxysuccinimide, 20 ml. of dimethylformamide and 320 mg. of dicyclohexylcarbodiimide is vigorously stirred and heated for 4 hours at 45° C., then poured into 350 ml. of peroxide-free ether and the fine precipitate is suctioned off and dried at 35° C. It is purified by counter-current distribution in the solvent system methanol+buffer+chloroform+carbon tetrachloride (10:3:5:4); buffer as described in Example 1.

The protected diglycyl-docosapeptide amide (11–32) used as starting material is obtained in a manner similar to that for the corresponding protected docosapeptide amide (11–32) described in the above-mentioned Kamber and Rittel, Helv. Chim. Acta *51* (1968), 2061 in Example 1 under (11) to (56) by using the corresponding glycine derivatives instead of $tyrosine^{12}$ and $lysine^{18}$ derivatives.

What is claimed is:

1. Peptides of the formula I

```
    1   2   3   4   5   6   7   8   9   10  11  12  13  14
H-Cys-Gly-Asn-Leu-Ser-Thr-Cys-Met-Leu-Gly-Thr-Tyr-Thr-Gln-
 15  16  17  18  19  20  21  22  23  24  25  26  27  28  29
Asp-Phe-Asn-Lys-Phe-His-Thr-Phe-Pro-Gln-Thr-Ala-Ile-Gly-Val-
 30  31  32
Gly-Ala-Pro-NH2
```

in which the aminoacid in position 8 is replaced by valine, norvaline, leucine, isoleucine, norleucine or α-aminobutyric acid, and those which contain glycine in position 12 and those which contain methionine in position 8 and glycine in positions 12 and 18, or at least in position 12, their antiparallel dimer and $N^\alpha$-acyl derivatives wherein acyl is lower monobasic or dibasic alkanoyl, lower alkyloxycarbonyl, benzyloxycarbonyl, L-pyroglutamyl, carbamoyl, N-lower alkylcarbamoyl, N-phenylcarbamoyl, or N-phenylthiocarbamoyl, or $desamino^1$-derivatives of the monomeric or dimeric peptides, as well as therapeutically acceptable acid addition salts and complexes with a member selected from the group consisting of zinc phosphate, zinc pyrophosphate, zinc hydroxide, gelatine, polyphloretin phosphate and polyglutamic acid, of the said monomeric or dimeric peptides with the proviso that all aminoacid residues other than glycine are of the L-configuration.

2. A dotriacontapeptide amide as claimed in claim 1 of the formula

H-Cys-Gly-Asn-Leu-Ser-Thr-Cys-X-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ in which X stands for the valine, norvaline, leucine, isoleucine, norleucine or α-aminobutyric acid residue, and therapeutically acceptable acid addition salts and complexes thereof, each of said aminoacid residues other than glycine being of the L-configuration.

3. The dotriacontapeptide amide as claimed in claim 2 of the formula

H-Cys-Gly-Asn-Leu-Ser-Thr-Cys-Nle-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ and therapeutically acceptable acid addition salts thereof, each of said aminoacid residues other than glycine being of the L-configuration.

4. The dotriacontapeptide amide as claimed in claim 2 of the formula

H-Cys-Gly-Asn-Leu-Ser-Thr-Cys-Val-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ and therapeutically acceptable acid addition salts thereof, each of said aminoacid residues other than glycine being of the L-configuration.

5. A derivative of a peptide as claimed in claim 1 of the formula $N\alpha$-Acyl-Cys-Gly-Asn-Leu-Ser-Thr-Cys-X-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ in which X stands for the valine, norvaline, leucine, isoleucine, norleucine or α-aminobutyric acid residue and therapeutically acceptable acid addition salts and complexes thereof, each of said aminoacid residues other than glycine being of the L-configuration.

6. The dotriacontapeptide amide as claimed in claim 1 of the formula 1 2 3 4 5 6 7 8 9 10 11 12 13 14
H-Cys-Gly-Asn-Leu-Ser-Thr-Cys-Met-Leu-Gly-Thr-Gly-Thr-Gln-
15 16 17 18 19 20 21 22 23 24 25 26 27 28 29
Asp-Phe-Asn-Gly-Phe-His-Thr-Phe-Pro-Gln-Thr-Ala-Ile-Gly-Val-
30 31 32
Gly-Ala-Pro-$NH_2$ its $N^{\alpha}$-acyl or desamino$^1$-derivatives, therapeutically acceptable acid addition salts and complexes, each of said aminoacid residues other than glycine being of the L-configuration.

7.

BOC-Cys-Gly-Asn-Leu-Ser(tBu)-thr-(tBu)-Cys-X-Leu-Gly-Thr(tBu)-Tyr(tBu)-Thr(tBu)-Gln-Asp(OtBu)-Phe-Asn-Lys(BOC)-Phe-His-Thr(tBu)-Phe-Pro-Gln-Thr(tBu)-Ala-Ile-Gly-Val-Gly-Ala-Pro-$NH_2$ in which X stands for the valine, norvaline, leucine, isoleucine, norleucine or α-aminobutyric acid residues, each of said aminoacid residues other than glycine being of the L-configuration.

8.

BOC-Cys-Gly-Asn-Leu-Ser-Thr-Cys-X-Leu-Gly-Thr-Tyr-Thr-Gln-Asp(OtBu)-Phe-Asn-Lys(BOC)-Phe-His-Thr-Phe-Pro-Gln-Thr-Ala-Ile-Gly-Val-Gly-Ala-Pro-$NH_2$ in which X stands for the valine, norvaline, leucine, isoleucine, norleucine or α-aminobutyric acid residue, each of said aminoacid residues other than glycine being of the L-configuration.

9.

H-Cys-Gly-Asn-Leu-Ser-Thr-Cys-X-Leu-Gly-OH in which X stands for the valine, norvaline, leucine, isoleucine, norleucine or α-aminobutyric acid residues, and its derivatives in which at least one of the amino, carboxyl or hydroxyl groups is protected, the amino-protecting group being the tertiary-butyloxy-carbonyl group, the carboxyl-protecting group being the tertiary-butyl-ester group and the hydroxyl-protecting group being the tertiary-butyl-ester group, and in which each of said aminoacid residues other than glycine being of the L-configuration.

10.

H-Cys-Gly-Asn-Leu-Ser-Thr-Cys-X-Leu-Gly-OH in which X stands for the valine, norvaline, leucine, isoleucine, norleucine or α-aminobutyric acid residue, and its derivatives in which at least one of the amino, carboxyl, mercapto or hydroxyl groups is protected, the amino-protecting group being the tertiary-butyloxy-carbonyl group, the carboxyl-protecting group being the tertiary-butyl-ester group, the mercapto-protecting group being the acetyl benzyl, trityl, benzoyl, ethylcarbamyl, tertiary butyl- or benzylthiomethyl group, and the hydroxyl-protecting group being the tertiary-butyl-ether group, and in which each of said aminoacid residues other than glycine being of the L-configuration.

11. Complexes of peptides as claimed in claim 1 with zinc phosphate, zinc pyrophosphate or zinc hydroxide.

12. Complexes of peptides as claimed in claim 1 with gelatine, polyphloretine phosphate or polyglutamic acid.

13. The dotriacontrapeptide amide as claimed in claim 2 of the formula

H-Cys-Gly-Asn-Leu-Ser-Thr-Cys-Leu-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ and therapeutically acceptable acid addition salts thereof, each of said aminoacid residues other than glycine being of the L-configuration.

14. The dotriacontapeptide amide as claimed in claim 2 of the formula

H-Cys-Gly-Asn-Leu-Ser-Thr-Cys-Nva-Leu-Gly-Thr-Tyr-Thr-Gln-Asp-Phe-Asn-Lys-Phe-His-Thr-Phe-Pro-Gln-Thr-Ala-Ile-Gly-Val-Gly-Ala-Pro-$NH_2$ and therapeutically acceptable acid addition salts thereof, each of said aminoacid residues other than glycine being of the L-configuration.

References Cited

UNITED STATES PATENTS

| | | | |
|---|---|---|---|
| 3,228,926 | 1/1966 | Kappeler et al. ____ | 260—112.5 |
| 3,352,844 | 11/1967 | Boissonnas et al. ____ | 260—112.5 |

OTHER REFERENCES

Sieber et al.: Helv. Chim. Acta *51,* 2057–61 (1968).
Guttmann et al.: Helv. Chim. Acta *51,* 1155–8 (1968).
Rittel et al.: Helv. Chim. Acta *51,* 924–8 (1968).

LEWIS GOTTS, Primary Examiner

R. J. SUYAT, Assistant Examiner

U.S. Cl. X.R.

424—177

UNITED STATES PATENT OFFICE

CERTIFICATE OF CORRECTION

PATENT NO. : 3,849,388

DATED : November 19, 1974

INVENTOR(S) : Werner Rittel et al

It is certified that error appears in the above-identified patent and that said Letters Patent are hereby corrected as shown below:

Column 45, line 23, "Nα" should be --- $N^{\alpha}$ ---.

Column 46, line 8, "butyl-ester" should be --- butyl-ether ---.

Signed and Sealed this

*fifth* Day of *August 1975*

[SEAL]

*Attest:*

RUTH C. MASON
*Attesting Officer*

C. MARSHALL DANN
*Commissioner of Patents and Trademarks*